US012306929B2

(12) United States Patent
Sandstrom

(10) Patent No.: US 12,306,929 B2
(45) Date of Patent: *May 20, 2025

(54) GRAPHIC PATTERN-BASED AUTHENTICATION WITH ADJUSTABLE CHALLENGE LEVEL

(71) Applicant: ThroughPuter, Inc., Williamsburg, VA (US)

(72) Inventor: Mark Henrik Sandstrom, Alexandria, VA (US)

(73) Assignee: ThroughPuter, Inc., Williamsburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,094

(22) Filed: Feb. 2, 2023

(65) Prior Publication Data
US 2023/0252126 A1 Aug. 10, 2023

Related U.S. Application Data

(63) Continuation of application No. 16/834,961, filed on Mar. 30, 2020, now Pat. No. 11,604,867.
(Continued)

(51) Int. Cl.
G06F 21/45 (2013.01)
G06F 21/36 (2013.01)

(52) U.S. Cl.
CPC ............. *G06F 21/45* (2013.01); *G06F 21/36* (2013.01); *G06F 2221/2103* (2013.01)

(58) Field of Classification Search
CPC ... G06F 21/45; G06F 21/36; G06F 2221/2103
See application file for complete search history.

(56) References Cited

U.S. PATENT DOCUMENTS 5,465,084 A 11/1995 Cottrell
7,124,433 B2 10/2006 Little
(Continued)

FOREIGN PATENT DOCUMENTS

CN 105976517 A 9/2016
EP 3559889 A1 10/2019
(Continued)

OTHER PUBLICATIONS

U.S. Appl. No. 16/798,310, filed Feb. 22, 2020, Sandstrom.
(Continued)

*Primary Examiner* — David Garcia Cervetti

(57) ABSTRACT

Online user account access control includes adjustable authentication challenge levels based on a level of match between observed attributes of a present login attempt and corresponding recorded attributes for the authentic user for the entered user identifier (UID). Login candidates whose attributes sufficiently closely match the recorded attributes for the entered UID are allowed to select an authentication graphic pattern registered for the UID from a set of alternatives, with the degree of complexity of such selection based authentication increasing according to the degree of difference between the observed attributes of the present login attempt and the corresponding recorded values for the UID, while by default, login candidates may be required to produce the registered authentication graphic pattern from blank slate. Accordingly, authentic, but only authentic, users are able to login with high convenience, with underlying graphic pattern-based passcode protected against dictionary-based and brute-force attacks, or capture, by unauthorized parties.

18 Claims, 5 Drawing Sheets

Related U.S. Application Data

(60) Provisional application No. 62/827,435, filed on Apr. 1, 2019, provisional application No. 62/857,573, filed on Jun. 5, 2019, provisional application No. 62/868,756, filed on Jun. 28, 2019, provisional application No. 62/871,096, filed on Jul. 6, 2019, provisional application No. 62/876,087, filed on Jul. 19, 2019.

(56) References Cited

U.S. PATENT DOCUMENTS

| | | | |
|---|---|---|---|
| 7,219,368 | B2 | 5/2007 | Juels et al. |
| 7,702,629 | B2 | 4/2010 | Cytron et al. |
| 7,844,825 | B1 | 11/2010 | Neginsky |
| 8,189,905 | B2 | 5/2012 | Eaton et al. |
| 8,458,485 | B2 | 6/2013 | Bandyopadhyay et al. |
| 8,539,550 | B1 | 9/2013 | Terres et al. |
| 8,601,552 | B1 | 12/2013 | Bowers et al. |
| 8,718,374 | B2 | 5/2014 | Ashbrook |
| 8,789,206 | B2 | 7/2014 | Harris |
| 8,868,919 | B2 | 10/2014 | Barton et al. |
| 8,881,251 | B1 | 11/2014 | Hilger |
| 8,904,479 | B1* | 12/2014 | Johansson .............. G06F 21/36 382/181 |
| 8,931,060 | B2 | 1/2015 | Bidare |
| 8,955,074 | B2 | 2/2015 | Barton et al. |
| 9,104,855 | B2 | 8/2015 | Vargas et al. |
| 9,111,073 | B1 | 8/2015 | Jiang et al. |
| 9,117,068 | B1 | 8/2015 | Zhang et al. |
| 9,165,159 | B1 | 10/2015 | McDonnell |
| 9,215,072 | B1 | 12/2015 | Barton et al. |
| 9,230,079 | B2 | 1/2016 | Yun |
| 9,235,715 | B1 | 1/2016 | Bailey et al. |
| 9,348,981 | B1 | 5/2016 | Hearn et al. |
| 9,813,409 | B2 | 11/2017 | Zia |
| 10,013,546 | B1 | 7/2018 | Johansson et al. |
| 10,120,989 | B2 | 11/2018 | Anson |
| 10,169,565 | B2 | 1/2019 | Zia et al. |
| 10,176,315 | B2 | 1/2019 | Riddiford |
| 10,754,814 | B1 | 8/2020 | Li et al. |
| 10,754,936 | B1 | 8/2020 | Hawes et al. |
| 11,003,749 | B2* | 5/2021 | Park .............. G06F 21/316 |
| 11,042,880 | B1 | 6/2021 | Hazan et al. |
| 11,561,983 | B2 | 1/2023 | Sandstrom |
| 11,604,867 | B2 | 3/2023 | Sandstrom |
| 11,893,463 | B2 | 2/2024 | Sandstrom |
| 2002/0029341 | A1* | 3/2002 | Juels .............. H04L 63/083 713/184 |
| 2004/0143750 | A1 | 7/2004 | Kulack et al. |
| 2005/0097320 | A1 | 5/2005 | Golan et al. |
| 2006/0174339 | A1 | 8/2006 | Tao |
| 2006/0206918 | A1 | 9/2006 | McLean |
| 2008/0208777 | A1 | 8/2008 | Stephens et al. |
| 2008/0244700 | A1* | 10/2008 | Osborn .............. G06F 21/36 726/2 |
| 2009/0037986 | A1 | 2/2009 | Baker |
| 2009/0187962 | A1 | 7/2009 | Brenneman et al. |
| 2010/0043062 | A1 | 2/2010 | Alexander et al. |
| 2010/0251388 | A1 | 9/2010 | Dorfman |
| 2010/0281526 | A1* | 11/2010 | Raghavan .............. H04L 63/083 726/7 |
| 2011/0010763 | A1 | 1/2011 | Beardslee |
| 2012/0026109 | A1 | 2/2012 | Baba |
| 2012/0066650 | A1 | 3/2012 | Tirpak et al. |
| 2012/0084734 | A1 | 4/2012 | Wilairat |
| 2012/0252409 | A1 | 10/2012 | Cao |
| 2013/0044954 | A1 | 2/2013 | Ashbrook |
| 2013/0139226 | A1 | 5/2013 | Welsch et al. |
| 2013/0276100 | A1 | 10/2013 | Yi et al. |
| 2013/0276125 | A1* | 10/2013 | Bailey .............. G06F 21/46 726/25 |
| 2013/0347066 | A1 | 12/2013 | Wells et al. |
| 2014/0025467 | A1 | 1/2014 | Nagarajan et al. |
| 2014/0115670 | A1 | 4/2014 | Barton et al. |
| 2014/0157382 | A1 | 6/2014 | Ford |
| 2014/0165186 | A1 | 6/2014 | Ramu et al. |
| 2014/0175179 | A1* | 6/2014 | Carter .............. G06Q 20/3224 235/494 |
| 2014/0195974 | A1 | 7/2014 | Ballard et al. |
| 2014/0344186 | A1 | 11/2014 | Nadler |
| 2014/0359300 | A1 | 12/2014 | Shirakawa |
| 2014/0365904 | A1 | 12/2014 | Kim et al. |
| 2015/0012444 | A1 | 1/2015 | Brown et al. |
| 2015/0143509 | A1 | 5/2015 | Selander et al. |
| 2015/0324559 | A1 | 11/2015 | Boss et al. |
| 2016/0110528 | A1 | 4/2016 | Gupta et al. |
| 2016/0132673 | A1 | 5/2016 | Birk et al. |
| 2016/0150260 | A1 | 5/2016 | Ovide |
| 2016/0253288 | A1 | 9/2016 | Reddy et al. |
| 2016/0277439 | A1 | 9/2016 | Rotter et al. |
| 2016/0306994 | A1* | 10/2016 | Olsen-Kreusch ..... H04L 9/3234 |
| 2016/0337346 | A1* | 11/2016 | Momchilov .............. G06F 21/34 |
| 2017/0064555 | A1 | 3/2017 | Johansson et al. |
| 2017/0109509 | A1* | 4/2017 | Baghdasaryan ....... G06Q 20/40 |
| 2017/0132404 | A1 | 5/2017 | Tao |
| 2017/0308644 | A1 | 10/2017 | Van et al. |
| 2017/0317993 | A1* | 11/2017 | Weber .............. H04L 63/08 |
| 2017/0323092 | A1 | 11/2017 | Thakur et al. |
| 2017/0331817 | A1* | 11/2017 | Votaw .............. G06F 21/42 |
| 2018/0032714 | A1 | 2/2018 | Zia et al. |
| 2018/0053274 | A1 | 2/2018 | Kendall et al. |
| 2018/0107920 | A1 | 4/2018 | Jayaraman et al. |
| 2018/0204403 | A1* | 7/2018 | Wang .............. C09K 11/77 |
| 2018/0248863 | A1* | 8/2018 | Kao .............. H04L 63/102 |
| 2018/0253717 | A1 | 9/2018 | Kim et al. |
| 2018/0300178 | A1 | 10/2018 | Sandstrom |
| 2019/0012074 | A1 | 1/2019 | Ajayan et al. |
| 2019/0034613 | A1 | 1/2019 | Jajoo et al. |
| 2019/0057207 | A1 | 2/2019 | Schwartz et al. |
| 2019/0095605 | A1 | 3/2019 | Gupta et al. |
| 2019/0137955 | A1 | 5/2019 | Fahrenkopf et al. |
| 2019/0220583 | A1* | 7/2019 | Douglas .............. G06V 40/70 |
| 2019/0312861 | A1 | 10/2019 | Kairi et al. |
| 2019/0316794 | A1 | 10/2019 | Song et al. |
| 2019/0347586 | A1 | 11/2019 | Kaulgud et al. |
| 2020/0026843 | A1 | 1/2020 | Anwar et al. |
| 2020/0065469 | A1 | 2/2020 | Norris, III |
| 2020/0066392 | A1 | 2/2020 | Bess et al. |
| 2020/0090240 | A1 | 3/2020 | Sinha et al. |
| 2020/0104737 | A1 | 4/2020 | Abaci et al. |
| 2020/0110651 | A1 | 4/2020 | Milman |
| 2020/0112560 | A1* | 4/2020 | Hunt .............. G06F 21/31 |
| 2020/0134167 | A1 | 4/2020 | Craymer et al. |
| 2020/0162451 | A1* | 5/2020 | Alhawaj .............. G06F 21/45 |
| 2020/0167914 | A1 | 5/2020 | Stamatoyannopoulos et al. |
| 2020/0285645 | A1 | 9/2020 | Sandstrom |
| 2020/0288306 | A1 | 9/2020 | Do et al. |
| 2020/0311250 | A1* | 10/2020 | Sandstrom .............. G06F 21/36 |
| 2020/0311586 | A1 | 10/2020 | Sandstrom |
| 2020/0387594 | A1 | 12/2020 | Sandstrom |
| 2023/0237376 | A1 | 7/2023 | Sanstrom |
| 2023/0246851 | A1* | 8/2023 | Lind .............. H04L 9/3247 |
| 2023/0262082 | A1* | 8/2023 | Shah .............. H04L 63/1425 726/6 |

FOREIGN PATENT DOCUMENTS

| | | |
|---|---|---|
| EP | 3935501 A1 | 1/2022 |
| EP | 3980910 A1 | 4/2022 |
| FR | 3037684 A1 | 12/2016 |
| IN | 202117043365 A | 1/2022 |
| JP | 2014211818 A | 11/2014 |
| RU | 2672394 C1 | 11/2018 |
| WO | 0177792 A2 | 10/2001 |
| WO | 2020181268 A1 | 9/2020 |
| WO | 2020247800 A1 | 12/2020 |

OTHER PUBLICATIONS

U.S. Appl. No. 16/812,158, filed Mar. 6, 2020, Sandstrom.
"Grid Locker", accessed at "https://www.f88x.com/modules/grid-locker-draw-a-plugin-wp-password-wordpress-utilities-download.

(56) References Cited

OTHER PUBLICATIONS html" accessed on Mar. 19, 2020, 2 pages. (Previously submitted in related U.S. Appl. No. 16/834,961).
Grzegorczyk, et al., "Vector Representations of Text Data in Deep Learning", AGH University of Science and Technology, Faculty of Computer Science, Electronics and Telecommunications, Department of Computer Science, arXiv: 1901.01695v1, Jan. 7, 2019, 105 pages. (Previously submitted in related U.S. Appl. No. 16/834,961).
Gewali, et al., "Machine Learning Based Hyperspectral Image Analysis: A Survey", Rochester Institute of Technology, Rochester, NY, arXiv: 1802.08701v2, Feb. 10, 2019, pp. 1-46. (Previously submitted in related U.S. Appl. No. 16/834,961).
Kaur, et al., "Multi-Factor Graphical Password for Cloud Interface Authentication Security", International Journal of Computer Applications, vol. 125, No. 7, Sep. 2015, pp. 32-35. (Previously submitted in related U.S. Appl. No. 16/834,961).
International Preliminary Report on Patentability for International Application No. PCT/US2020/021581 dated Sep. 16, 2021, 15 pages. (Previously submitted in related U.S. Appl. No. 16/834,961).
International Preliminary Report on Patentability for International Application No. PCT/US2020/036394 dated Dec. 16, 2021, 9 pages. (Previously submitted in related U.S. Appl. No. 16/834,961).
International Search Report and Written Opinion for International Application No. PCT/US2020/021581 dated Jul. 22, 2020, 18 pages. (Previously submitted in related U.S. Appl. No. 16/834,961).
International Search Report and Written Opinion for International Application No. PCT/US2020/036394 dated Sep. 30, 2020, 14 pages. (Previously submitted in related U.S. Appl. No. 16/834,961).
Invitation to Pay Additional Fees and, Where Applicable, Protest Fee for International Application No. PCT/US2020/036394 mailed Jul. 21, 2020, 3 pages. (Previously submitted in related U.S. Appl. No. 16/834,961).
Invitation to Pay Additional Fees and, Where Applicable, Protest Fee of PCT Application No. PCT/US2020/021581 dated May 5, 2020, 2 pages. (Previously submitted in related U.S. Appl. No. 16/834,961).
Non-Final Office Action dated Jul. 25, 2022 in U.S. Appl. No. 16/834,961, 16 pages. (Previously submitted in related U.S. Appl. No. 16/834,961).
Non-Final Office Action dated Jun. 6, 2022 in U.S. Appl. No. 16/834,961, 10 pages. (Previously submitted in related U.S. Appl. No. 16/834,961).
Non-Final Office Action dated May 20, 2022 in U.S. Appl. No. 16/894,177, 35 pages. (Previously submitted in related U.S. Appl. No. 16/834,961).
Response to Non-Final Office Action filed Aug. 19, 2022 in U.S. Appl. No. 16/894,177, 12 pages. (Previously submitted in related U.S. Appl. No. 16/834,961).
Non-Final Office Action dated Apr. 6, 2022 in U.S. Appl. No. 16/834,961, 9 pages.
Notice of Allowance dated Jul. 19, 2022 in U.S. Appl. No. 16/834,961, 7 pages.
Extended European Search Report dated Jun. 28, 2023 in EP Application No. 20817925.9, 13 pages.
Bruzzone et al., "Robust Multiple Estimator Systems for the Analysis of Biophysical Parameters From Remotely Sensed Data", IEEE Transactions on Geoscience and Remote Sensing, vol. 43, No. 1, dated Jan. 2005, 16 pages.
Cavalin et al., "Dynamic Selection Approaches For Multiple Classifier Systems", Neural Comput & Applic, Mar. 11, 2011, pp. 673-688.

\* cited by examiner

Matrix #1)

|    | 1 | 2 | 3 | 4 | 5 | 6 | 7 | 8 | 9 | 10 | 11 |
|----|---|---|---|---|---|---|---|---|---|----|----|
| 1  | ■ |   | ■ | ■ | ■ | ■ | ■ | ■ | ■ | ■  | ■  |
| 2  | ■ |   | ■ | ■ | ■ | ■ | ■ | ■ | ■ | ■  | ■  |
| 3  | ■ |   | ■ | ■ | ■ | ■ | ■ | ■ | ■ | ■  | ■  |
| 4  | ■ |   | ■ | ■ | ■ | ■ | ■ | ■ | ■ | ■  | ■  |
| 5  |   |   | ■ | ■ | ■ | ■ | ■ | ■ | ■ | ■  | ■  |
| 6  | ■ |   | ■ | ■ | ■ | ■ | ■ | ■ | ■ | ■  | ■  |
| 7  | ■ |   |   |   |   |   |   |   |   |    |    |
| 8  | ■ |   | ■ | ■ | ■ | ■ | ■ | ■ | ■ | ■  | ■  |
| 9  | ■ |   | ■ | ■ | ■ | ■ | ■ | ■ | ■ | ■  | ■  |
| 10 | ■ |   | ■ | ■ | ■ | ■ | ■ | ■ | ■ | ■  | ■  |
| 11 | ■ |   | ■ | ■ | ■ | ■ | ■ | ■ | ■ | ■  | ■  |

FIG. 3

Matrix #2)

|   | 1 | 2 | 3 | 4 | 5 | 6 | 7 | 8 | 9 | 10 | 11 |
|---|---|---|---|---|---|---|---|---|---|----|----|
| 1 | ■ | ■ | ■ |   | ■ | ■ | ■ | ■ | ■ | ■  | ■  |
| 2 | ■ | ■ | ■ |   | ■ | ■ | ■ | ■ | ■ | ■  | ■  |
| 3 | ■ | ■ | ■ |   | ■ | ■ | ■ | ■ | ■ | ■  | ■  |
| 4 | ■ | ■ | ■ |   | ■ | ■ | ■ | ■ | ■ | ■  | ■  |
| 5 |   | ■ | ■ |   | ■ | ■ | ■ | ■ | ■ | ■  | ■  |
| 6 |   | ■ |   |   |   |   |   |   |   |    |    |
| 7 | ■ | ■ | ■ |   | ■ | ■ | ■ | ■ | ■ | ■  | ■  |
| 8 | ■ | ■ | ■ |   | ■ | ■ | ■ | ■ | ■ | ■  | ■  |
| 9 | ■ | ■ | ■ |   | ■ | ■ | ■ | ■ | ■ | ■  | ■  |
| 10| ■ | ■ | ■ |   | ■ | ■ | ■ | ■ | ■ | ■  | ■  |
| 11| ■ | ■ | ■ |   | ■ | ■ | ■ | ■ | ■ | ■  | ■  |

FIG. 4A

Matrix #3)

|   | 1 | 2 | 3 | 4 | 5 | 6 | 7 | 8 | 9 | 10 | 11 |
|---|---|---|---|---|---|---|---|---|---|----|----|
| 1 | ■ | ■ | ■ | ■ | ■ | ■ | ■ |   | ■ | ■  | ■  |
| 2 | ■ | ■ | ■ | ■ | ■ | ■ | ■ |   | ■ | ■  | ■  |
| 3 | ■ | ■ | ■ | ■ | ■ | ■ | ■ |   | ■ | ■  | ■  |
| 4 | ■ | ■ | ■ | ■ | ■ | ■ | ■ |   | ■ | ■  | ■  |
| 5 |   | ■ |   |   |   |   |   |   |   |    |    |
| 6 |   | ■ | ■ | ■ | ■ | ■ | ■ |   | ■ | ■  | ■  |
| 7 |   | ■ | ■ | ■ | ■ | ■ | ■ |   | ■ | ■  | ■  |
| 8 | ■ | ■ | ■ | ■ | ■ | ■ | ■ |   | ■ | ■  | ■  |
| 9 | ■ | ■ | ■ | ■ | ■ | ■ | ■ |   | ■ | ■  | ■  |
| 10| ■ | ■ | ■ | ■ | ■ | ■ | ■ |   | ■ | ■  | ■  |
| 11| ■ | ■ | ■ | ■ | ■ | ■ | ■ |   | ■ | ■  | ■  |

FIG. 4B

Matrix #4)

|   | 1 | 2 | 3 | 4 | 5 | 6 | 7 | 8 | 9 | 10 | 11 |
|---|---|---|---|---|---|---|---|---|---|----|----|
| 1 | G | G | G | G | G | G | G | G | G | G  | G  |
| 2 | G | G | G | G | G | G | G | G | G | G  | G  |
| 3 | G | G | G | G | G | G | G | G | G | G  | G  |
| 4 | G | G | G | G | G | G | G | G | G | G  | G  |
| 5 | G | G | G | G | G | G | G | G | G | G  | G  |
| 6 | G | G | G | G | G | ■ | G | G | G | G  | G  |
| 7 | G | G | G | G | G | G | G | G | G | G  | G  |
| 8 | G | G | G | G | G | G | G | G | G | G  | G  |
| 9 | G | G | G | G | G | G | G | G | G | G  | G  |
| 10| G | G | G | G | G | G | G | G | G | G  | G  |
| 11| G | G | G | G | G | G | G | G | G | G  | G  |

FIG. 4C

GRAPHIC PATTERN-BASED AUTHENTICATION WITH ADJUSTABLE CHALLENGE LEVEL

CROSS-REFERENCE TO RELATED APPLICATIONS

This application is a continuation of and claims priority to U.S. patent application Ser. No. 16/834,961, entitled "Graphic Pattern-Based Authentication with Adjustable Challenge Level", filed on Mar. 30, 2020, which in incorporated by reference in its entirety, and which claims the benefit of the following applications, each of which is incorporated by reference in its entirety:
[1] U.S. Provisional Patent Application Ser. No. 62/827,435, entitled "Hierarchical, Self-Tuning Object Estimator", filed on Apr. 1, 2019;
[2] U.S. Provisional Patent Application Ser. No. 62/857,573, entitled "Online Trained Object Estimator", filed on Jun. 5, 2019;
[3] U.S. Provisional Patent Application Ser. No. 62/868,756, entitled "Graphic Pattern Based Authentication", filed on Jun. 28, 2019;
[4] U.S. Provisional Patent Application Ser. No. 62/871,096, entitled "Graphic Pattern Based Passcode Generation and Authentication", filed on Jul. 6, 2019;
[5] U.S. Provisional Patent Application Ser. No. 62/876,087, entitled "Graphic Pattern Based User Passcode Generation and Authentication", filed on Jul. 19, 2019.

This application is also related to the following co-pending or patented applications, each of which is incorporated by reference in its entirety:
[6] U.S. patent application Ser. No. 16/798,310, entitled "Online Trained Object Property Estimator", filed on Feb. 22, 2020;
[7] U.S. patent application Ser. No. 16/812,158, entitled "ONLINE TRAINED OBJECT PROPERTY ESTIMATOR", filed on Mar. 6, 2020.

BACKGROUND

Technical Field

The following disclosure pertains to the field of online user access control, more precisely, to techniques of adjusting the user authentication challenge level based on observed attributes of the online user.

Descriptions of the Related Art

Conventional passcodes are typically at least either (1) difficult for the user to remember, such that users would tend to resort to unsecure practices for storing the non-memorized passcodes and/or leaving their sessions open whenever possible, or (2) easy for unauthorized parties to guess, even e.g. by a brute-force effort to see what original passcode would create an encrypted or hashed passcode obtained for instance when in-transit on the network or stored on the server side. Moreover, biometric etc. advanced, multi-dimensional user authentication schemes are costly, inconvenient and/or cause operational inefficiencies, yet they often have limited usage due to special requirements for the authentication end-points, which are hard to get universally supported. There thus is a need for inventions enabling the efficient creation and validation of strong-security passcodes, which are not vulnerable either to brute-force attacks or peer human users' attempts to learn other users' access credentials, and yet are logical and memorizable to their authorized users.

SUMMARY

According to an embodiment of the herein disclosed graphical password generation and authentication system, an online user access control involves (1) registering a user to create for the user's account the user ID and its accompanying strong-security passcode, using a graphic pattern based passcode generation, and (2) authenticating a registered user through requesting the user to produce a valid user ID and its accompanying graphic pattern. Naturally, the user registration may involve further steps, e.g. payments and/or other forms of user authorization etc., and the authentication may also include further steps, e.g. querying the user for non-stored information that the authentic user would readily know, at least approximately, but an unauthorized party attempting the login has no access to.

An aspect of the present disclosure includes a method for access control on a computer system involving (I) registering a user, by storing for an account of the user, on a non-transitory digital memory in the computer system, a user ID (UID) and, through converting a user-entered graphic pattern to a digital bit vector, a passcode associated with the user's UID, where the user-entered graphic pattern is referred to as the graphic pattern associated with the user's UID or simply as the UID graphic pattern, and where the converting involves encoding the user's selection of graphic elements for each of a collection of graphic elements to a digital code corresponding to each respective selection, and concatenating the codes into the digital vector to form the user's passcode, and (II) authenticating a given returning user, referred to as a login candidate, through having the computer system configured to (a) request the login candidate to enter a unique UID to be stored in the system, and once the login candidate has entered such a valid UID, (b) prompt the given login candidate to correctly produce the graphic pattern associated with the entered UID by (i) entering at least a requested part of the UID graphic pattern, and/or (ii) selecting, from a number of alternative graphic patterns potentially associated with the UID, a graphic pattern sufficiently closely matching the graphic pattern of the entered UID, (c) encode each of a set of graphic elements in the graphic pattern produced by the login candidate into its corresponding digital code, and concatenate such codes into a digital vector to form a trial passcode submitted by the login candidate, (d) establish a correctness score for the login candidate's response per (a) and (b) above, by comparing the trial passcode produced by the login candidate against the stored passcode associated with the entered UID, and (e) based at least in part on a sufficiently good level of the correctness score, treat the given login candidate as authenticated by the access control process, while otherwise treating that given login candidate as non-authenticated.

Moreover, at least some embodiments of such a method include further features whereby, (i) any of one of the graphic patterns (1) is visualized as a graphic pattern template, providing a collection of user-selectable elements, displayed on a remote or local computer or device screen to the user, where such elements each have a color, symbol or other visual property selectable or selected from a range of alternatives, such that the user-entered graphic pattern includes a pattern of the user's selections for the individual elements of the graphic pattern template, and/or (2) includes a sequence of individual units of the graphic pattern templates that are editable or edited by the user, (ii) where any information sent to and/or stored at any of the communicating participants is encrypted using the recipient's public key such that only the intended recipient, using its private key, can decrypt such information, as well as encrypted using the sender's private key such that it is known to be from the valid sender in case it decrypts using the sender's public key (with such encryption scheme referred to herein as asymmetric encryption).

In one aspect, the present disclosure relates to controlling access to an online user account by prompting a login candidate to enter a registered user identifier (UID), and recording a feature vector (FV) having a number of components each representing an observed aspect of the login candidate for the present login attempt. The observed aspects, in some examples, may include characteristics of the login candidate's typing of the UID, characteristics of the login candidate's usage of a pointing device such as a mouse, information regarding hardware and/or software of a computing device being used by the login candidate, one or more network addresses of the login session for the login candidate, or information regarding a web browser being used by the login candidate. Information for a set of model FVs each recorded during a successful login attempt for the entered UID may be retrieved from a database for comparison to the present FV to form an assessment of risk that the login candidate is unauthentic. Responsive to the results of the assessment of risk, a level of authentication challenge may be adjusted for the login candidate.

In some embodiments, the comparison includes determining a measure of difference between the present FV and the set of model FVs for the entered UID. Further to these embodiments, forming the assessment of risk includes calculating a risk score based on the measure of difference for whether the login candidate is unauthentic. The risk score may be used to adjust the level of authentication challenge for the login candidate.

In some embodiments, adjusting the level of authentication challenge includes, for a certain value of the assessment corresponding to a higher risk that the login candidate is unauthentic, requiring the login candidate to produce, from an empty outline, a graphic pattern registered for the entered UID. In some implementations, the graphic pattern registered for the entered UID is composed of a graphic pattern sequence of two or more graphic pattern stages. In this circumstance, adjusting of the level of authentication challenge may include, for elevating values of the assessment corresponding to the lower risk that the login candidate is unauthentic, correspondingly elevating the authentication challenge for the login candidate through increasing a number of successive menus, each displaying a separate set of alternative completed graphic patterns from which the candidate is required to select one graphic pattern sufficiently close to a respective graphic pattern stage of the graphic pattern sequence registered for the entered UID.

In some embodiments, adjusting the level of authentication challenge includes, for a certain other value of the assessment corresponding to a lower risk that the login candidate is unauthentic, prompting the login candidate to select from a displayed set of alternative completed graphic patterns one that is sufficiently close to the graphic pattern registered for the entered UID. Elevating authentication challenge for the login candidate in these embodiments may include increasing a total number of graphic patterns in the displayed set of alternative completed graphic patterns from which login candidate is to select one sufficiently close to the graphic pattern registered for the entered UID, decreasing a number of alternative graphic patterns among the displayed set of alternative completed graphic patterns that are deemed as sufficiently close to the graphic pattern registered for the entered UID, or decreasing a time limit by which the login candidate is required to select from the displayed set of alternative completed graphic patterns one sufficiently close to the graphic pattern registered for the entered UID. In some implementations, the graphic pattern registered for the entered UID includes a graphic pattern sequence of two or more graphic pattern stages, and adjusting the level of authentication challenge includes, for elevating values of the assessment corresponding to the lower risk that the login candidate is unauthentic, correspondingly elevating the authentication challenge for the login candidate through increasing a number of successive menus, each displaying a separate set of alternative completed graphic patterns from which the candidate is required to select one graphic pattern sufficiently close to a respective graphic pattern stage of the graphic pattern sequence registered for the entered UID.

In some implementations, the present FV is stored to supplement model FVs or other example FVs for use by the methods and systems of the present disclosure. For example, in some cases where the login candidate is ascertained as authentic, present FV may be stored as one of the set of model FVs for the entered UID. Conversely, in some cases where the login candidate is ascertained as unauthentic, the present FV may be stored as one of a set of invalid FVs. For example, the comparison may comprise determining whether the present FV is closer to the set of model FVs for the entered UID than to a set alternate FVs which represent login attempts by login candidates that are unauthentic for the account of the entered UID, and the set of alternate FVs include at least a portion of the set of invalid FVs. The set of alternative FVs may further include at least some FVs formed based on FVs stored for accounts of other UIDs. Further to the example, forming the assessment of risk may include classifying the login candidate as likely authentic for the entered UID in cases where the present FV is closer to the set of model FVs, and otherwise classifying the login candidate as likely unauthentic. In another example, the set of alternative FVs may include two or more subsets, including (i) a subset of FVs corresponding to login attempts for the account of the entered UID by candidates determined to be unauthentic, and (ii) a subset of FVs formed based on models FVs of other UIDs. Further to this example, determining that the present FV is closer to the set of model FVs for the entered UID may include determining that the present FV is closer to the set of model FVs than to any subset of the set of alternative FVs.

BRIEF DESCRIPTION OF THE DRAWINGS

The drawings and tables (collectively, diagrams), which are incorporated in and constitute a part of the specification, illustrate one or more embodiments and, together with the description, explain these embodiments. Any values and dimensions illustrated in the diagrams are for illustration purposes only and may or may not represent actual or preferred values or dimensions. Where applicable, some features of embodiments may be omitted from the drawings to assist in focusing the diagrams to the features being illustrated. In the drawings:

FIG. 3 illustrates a further example of a possible memorable color pattern for a user's color matrix, that the system per the disclosure would convert to a cryptic (non-memorable) passcode.

FIGS. 4A through 4C illustrate as a succession of three matrices in series with the first matrix of FIG. 3, a memorable 4-matrix series of color patterns.

GENERAL SYMBOLS AND NOTATIONS USED IN THE DRAWINGS

Figure 1:
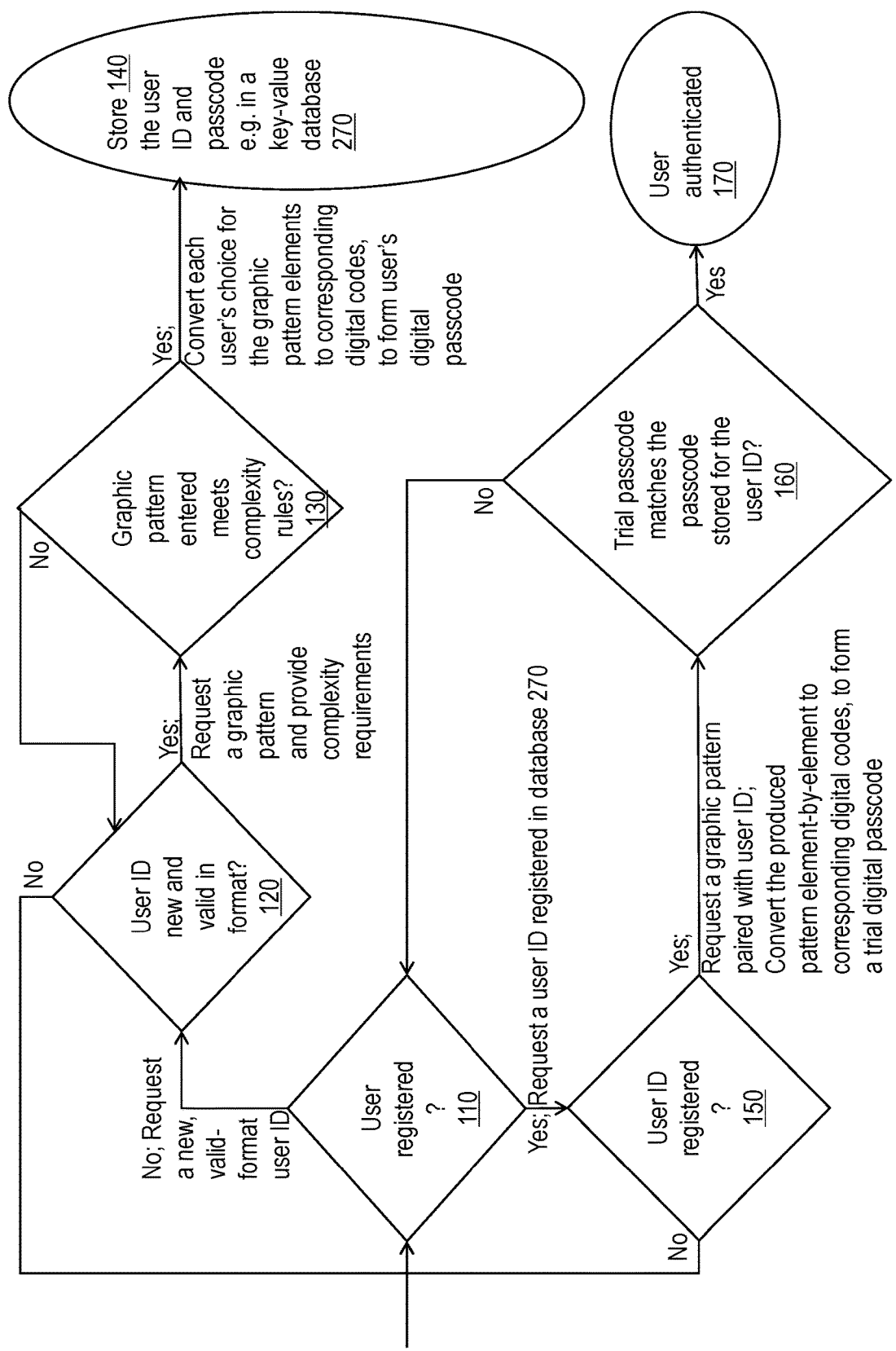
FIG. 1 illustrates a logic flow diagram of major steps for registering new users and for authenticating registered users, according to simple operating scenarios for an embodiment of the disclosed authentication system.

Boxes indicate a functional module comprising digital logic.

A dotted line box may be used to mark a group of drawn elements that form a logical entity.

Arrows indicate a digital signal flow. A signal flow may include one or more parallel bit wires. The direction of an arrow indicates the direction of primary flow of information associated with it with regards to discussion of the system functionality herein, but does not preclude information flow also in the opposite direction. A gapped arrow indicates a control, rather than primary data, flow.

An arrow reaching to a border of a hierarchical module indicate connectivity of the associated information to/from all sub-modules of the hierarchical module.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

DETAILED DESCRIPTION

According to an embodiment of the present disclosure, implemented with computer and network systems, exemplary cases of online user authentication operate per the following descriptions. For illustration, simplified examples of the sub-cases of A) new user registration, and B) validating passcode of a registered user, are illustrated in FIG. 1. Note that, even if not specifically mentioned or depicted, in typical embodiments of systems and methods per this description, all sensitive information, when exchanged between the communicating participants (user's agent e.g. a web browser, and the authentication system) as well as when stored the authentication system is hashed and/or encrypted, using e.g. the Public Key Infrastructure mechanism (PKI, e.g. using the secure hypertext transfer protocol (HTTPS), Transport Layer Security (TLS) or applicable successor protocols for interactions over the Internet), to prevent $3^{rd}$ party access to information such as the passcodes.

The process per FIG. 1 begins by the logic of the system having a user seeking to access the given access-control domain (and its contents, functionality etc. resources) to select 110 to either, in case the user is non-registered, get registered with this login system, or in case of a registered user, log-in with the system. The sub-process for registering a new user is described below, followed by the sub-process for authenticating a returning user.

(A) Registration:

(1) In the sub-process for registering a new user, the authentication system requests 120 a non-registered user to enter a unique ID (UID, e.g. user's email address). The logic of the system checks with its database of registered UIDs whether the entered UID is available, and if not (i.e. the given UID was already registered), the system will inform the user of that fact (e.g. via displaying a message to such effect) and prompt 110 the new user to either enter an actual new UID (or in case the given user remembers already having an account with the system, to get authenticated for the existing UID). Once the new user has entered a non-previously registered UID, the user registration sub-process will, e.g. via a link in an email sent to the user's email address, present to the user an array of user-selectable graphic elements. e.g. a 2-dimensional matrix of cells. to be colored by the registering user, with each cell initially marked with an inactive pattern (e.g. index of the cell), for instance per example of Table 1. below:

TABLE 1

| A (small) example of to-be-colored matrix. | | |
|---|---|---|
| 0 | 1 | 2 |
| 3 | 4 | 5 |
| 6 | 7 | 8 |

In some scenarios, the authentication system will ask the registering new user to make choices for geometric etc. attributes for the graphic pattern template to be used for authentication for this user ID; for instance, the system logic can request the user to choose e.g. one of more of the following type attributes for the graphic pattern generator to be used for authenticating the user:

dimensions for a matrix to be colored (in a given range, such that each of the dimensions, as well as their product, will have a defined minimum and maximum number of elements);

the shape of the graphic pattern made of the basic elements to be colored, e.g. a pyramid, a triangle, a hexadecimal character in a seven-segment display system (the type commonly used in pocket calculators); and/or orientation of the shape (along a dimension by which it is not symmetric).

In addition, or alternatively, the user may be given a choice that the graphic pattern elements are to be filled with one of alternative symbols (e.g. alphanumeric characters), etc. While such variations for the user's graphic pattern entry are supported by the herein described graphic pattern based digital passcode generation and authentication method, for the sake of clarity, this description proceeds by specifying the case of a symmetric matrix for whose elements are to be colored by the user.

Figure 2:
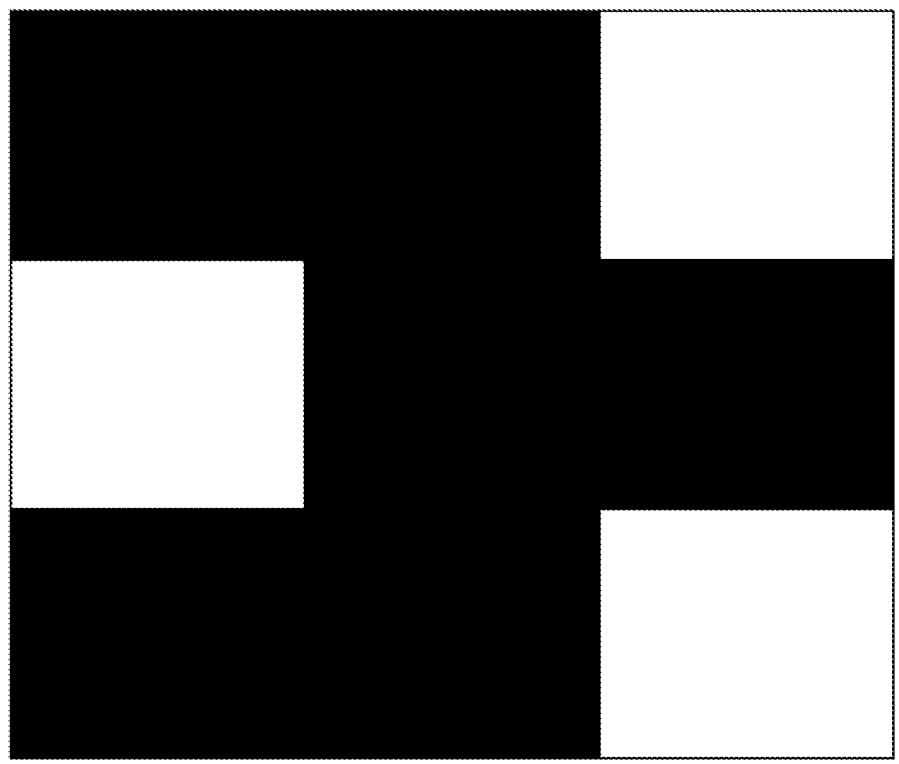
FIG. 2 illustrates a simple example of a user's graphic pattern that could be used to generate a passcode.

(2) After instructing the user to verify that no one can see the user's coloring of the grid, the authentication system gives the user the minimum complexity requirements for a color pattern (e.g. the available color palette and how many colors to use in minimum, etc.), and instructs the user to indicate once the user has chosen a memorable color pattern for the matrix. Once so indicated by the user, the system prompts the user to accordingly select one of the available colors for each cell of the matrix, e.g. per FIG. 2 (assuming available colors included black and white). For faster completion of the color matrix, in some embodiments, the system allows the user to select multiple cells at once, e.g., via the user selecting a default color for all the cells of the matrix, or by having the user to select a range of cells of the matrix to be colored with the same chosen color; the user will then get to change the color of individual cells among such default-colored cells. Before enabling the user to submit the color pattern for the completed matrix for passcode generation, the registration sub-process verifies 130 that the color pattern entered by the user meets the minimum complexity requirements, and after such verification, prompts the user to memorize the color pattern submitted. The registration sub-process stores 140 the submitted color pattern, as a vector of digits, with each digit in the vector representing the color in the user's color pattern for its corresponding cell in the matrix, and associates that digital vector representation of the user's color pattern with the user's ID. As mentioned in the opening paragraph of this Detailed Description, in security-hardened embodiments, an encrypted and/or hashed version of the digital vector representation of the user's color matrix, rather than the plain digital vector of the color choices for matrix cells, gets stored 140 in the database 270 of passcodes for the registered UIDs. Such principle applies throughout this description, though for the sake of better comprehensibility of the operation of the graphical passcode-based authentication, the passcodes may be discussed as vectors of numbers corresponding to the given user's color choices for the matrix cells.

The digital vector representation, in turn, can be understood as a number with radix K for K colors available for each cell in the matrix. An N-by-N matrix to be colored, with K colors available for each cell, provides thus $(N^2)^K$ unique coloring patterns for the matrix. For instance, if there are sixteen (16) available colors (coded to base-16 numbers e.g. as pink=0, red=1, orange=2, yellow=3, lime=4, green=5, turquoise=6, blue=7, violet=8, copper=9, gold=A, beige=B, brown=C, black=D, gray=E, white=F), e.g. a 11-by-11 matrix provides $16^{(11^2)}$ i.e. more than $10^{145}$ color pattern alternatives, with passcode entropy of $=(11^2)*\log 2(16)=484$ bits. The entropy here reflects the number of systematic guesses needed before surely getting the user's color pattern, and assuming users' color patterns are not predictable, that would be equal to the number of bits in the appended binary vector representation of the color pattern, which in this example, has $11^2=121$ hexadecimal (4 bit) digits i.e. 121*4=484 bits. At the time of preparing this specification, passcodes with entropy of 128 bits or greater were considered very strong; each additional bit of the entropy count doubles the search space for possible passwords.

Figure 3:
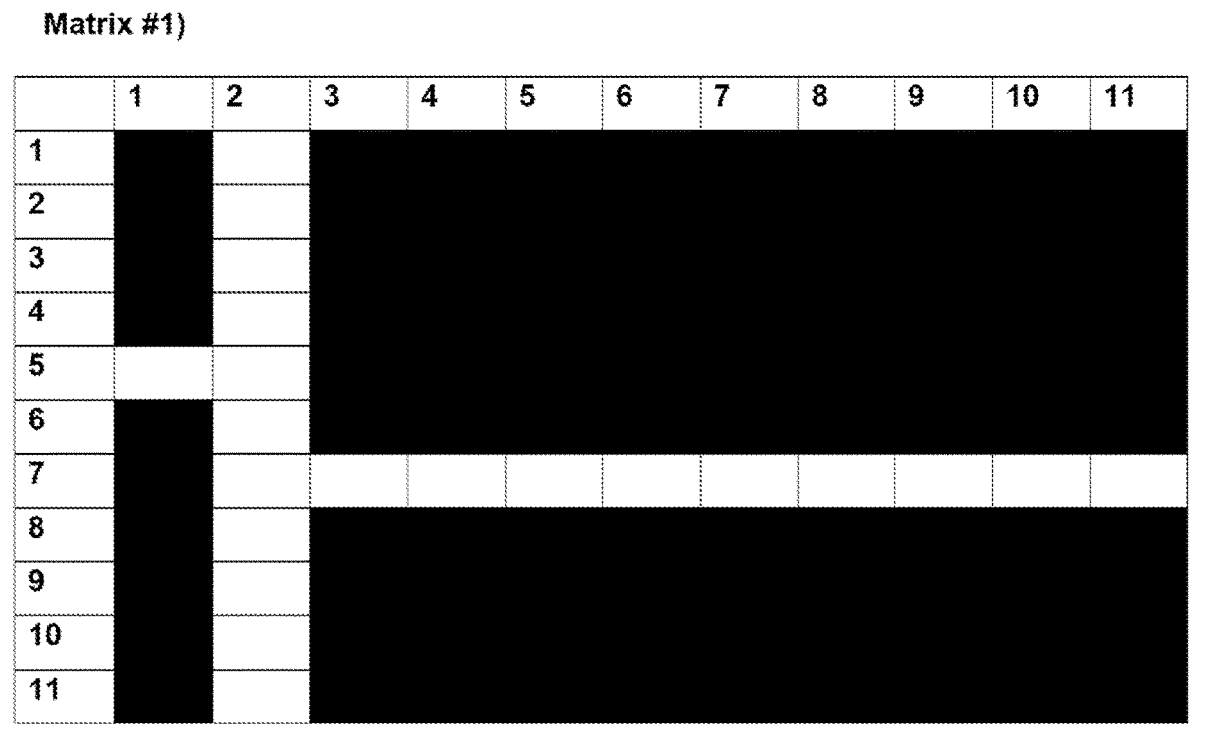

As an example, if the user used just black and white of the available cell color options, a possible (memorable) color pattern for the user's matrix could be e.g. as illustrated in FIG. 3.

For further range of the user's color pattern, the system can instruct the user to provide e.g. a 4-matrix series of color patterns; a memorable series, starting from the above matrix #1, could continue e.g. per matrices a), b) and c) of FIGS. 4A through 4C.

For the 4-matrix sequence example of FIGS. 3 and 4A-C, where the color matrix of FIG. 3 is referred to as Matrix #1 and the three successive matrices of FIGS. 4A-C as Matrices #2, #3 and #4, the user needs to memorize the matrix #1, and that its (white) bar elements will move in the following diagrams, as follows:

Matrix #1: Black background, white bar on $2^{nd}$ column, connected to left edge by a bar on row above, and to the right edge, by a row below, the center row.

Matrices #2-4: The column bar moves to right, at accelerating pace of 2, 4 ( . . . ) steps, the bar to left edge widens downward at one step per stage, the bar to right edge rises one step per stage; if/once any of the bars cross any of the edges, the matrix grays out, with the center cell black. The gray cells are marked with letter "G" in the matrix 4.

The above example authentication pattern with color matrices is feasible for the user to memorize (it has a logical progression), but it still is semi-random and not guessable, for instance along the following degrees:

The choices of the number (e.g. 3) and selection (e.g. which 3 of the 16) of colors is not predictable (though it is memorizable for the user);

The initial pattern is abstract and asymmetric and thus not guessable (though it is memorizable);

The movements of the objects are optional, multi-directional and non-systematic, non-linear and non-monotonous, and thus unpredictable overall (though still memorizable);

The changes between the stages in the series are not linear, and thus not guessable (though the sequence follows a non-linear logic designed by the user and thus is memorizable to the user).

Thus, if the users' color matrix sequences are considered semi-random, the passcode entropy of a 4-stage series of 11-by-11 matrices of 16 colors is $4*(11^2)*\log 2(16)=1936$ bits.

Some implementations can be configured to prompt the user to create a relatively long sequence of authentication color matrices, of which the user, when logging in, however needs to enter (or identify) potentially only a sub-sequence if the system determines that the observed circumstances of the login attempt are in the expected range, and if the user enters (or selects) the correct color matrix for the requested stages in the user's authentication matrix sequence.

For clarity, a vector representation of a user's color matrix pattern (series) can be formed simply as a vector of digits that each reflect the color the user selected for the corresponding matrix cell. For instance, the 1st row in the Matrix #1 would be represented as a vector of hexadecimal digits DFDDDDDDDDD (where a digit 'D' signals a black, and a digit 'F' a white, cell in that row, per the 16-color coding scheme per above). As further examples, the 6th row of the Matrix #2 would be represented by the hex-digit vector FDFFFFFFFFF, while the last (11th) row of the final Matrix #4 by the vector EEEEEEEEEEE. If the user had selected for instance red as the background for the Matrix #2, the vector representation of its 6th row would be 1D111111111, and so on. In any case, these digit vectors for the user's color matrix pattern (series) are concatenated from the first to last to form the completed vector representation for the user's graphically entered passcode. With eleven 11-element rows for a series of 4 matrices, the user's passcode vector would thus be a total of 11*11*4=484 hexadecimal characters (with each hexadecimal character requiring 4 bits) i.e. 1936 bits (or 242 bytes).

Note that, per this specification, the size of the user's graphic pattern based passcode thus is based on simply the number of bits in the hexadecimal digit vector representation of the graphic pattern, e.g., for the 11-by-11 color matrices per above, 484 bits per a matrix, which is much less than the size of typical graphic files that typically would consume at least several kilobits i.e. at least in the order of 1000-times as much memory, storage and/or network transmission capacity.

Figure 5:
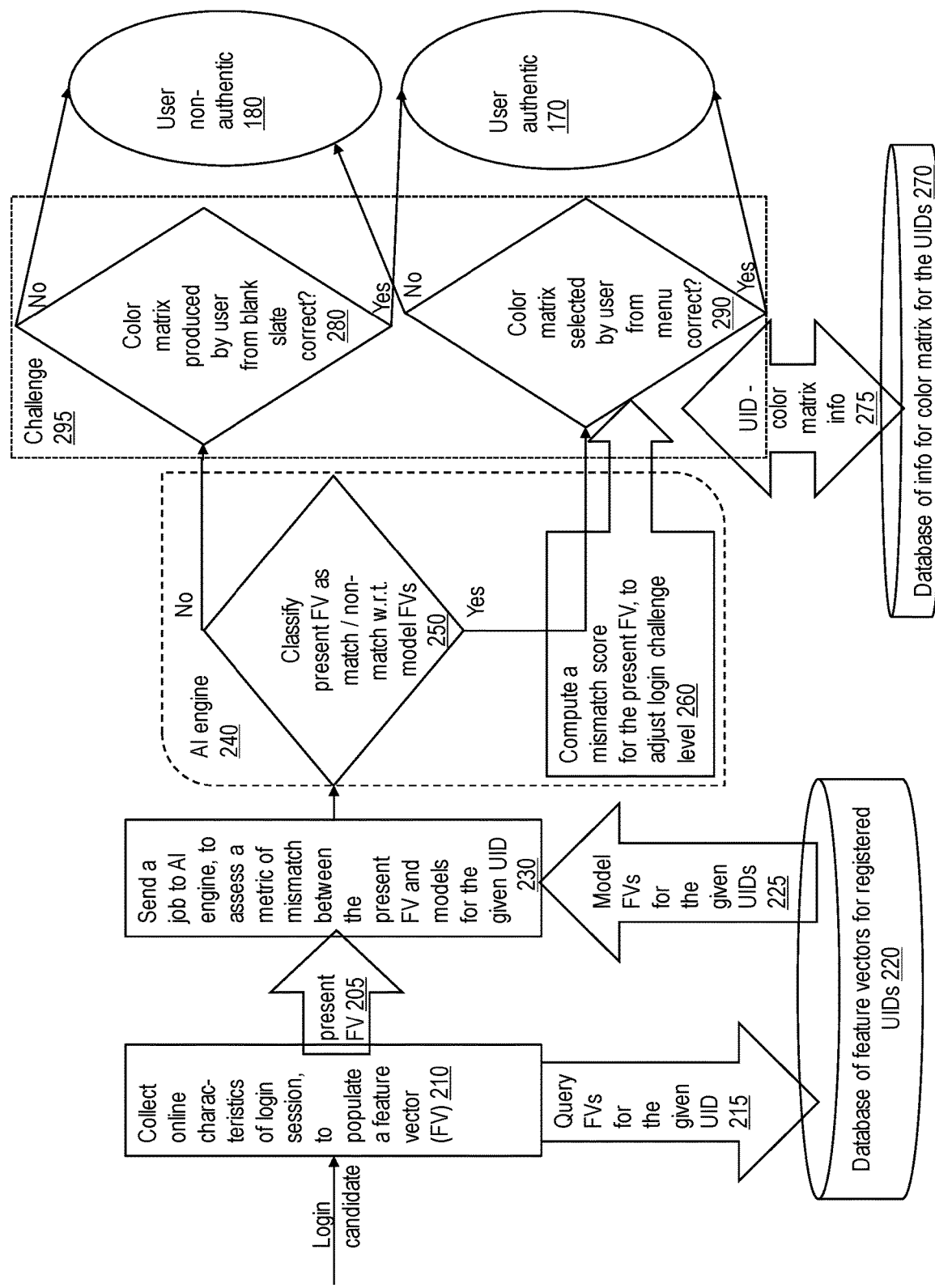
FIG. 5 illustrates a logic flow diagram of major steps for adjusting the level of authentication challenge based on a level of deviation between observed vs. expected values of a defined set of online behavior features of a login candidate, according to an example embodiment of the disclosed authentication system.

The procedures for resetting one's password with the herein described graphical password generation follow the herein described procedures for a new user registering one's graphic pattern-based password. Naturally, to initiate the graphic based passcode regeneration for a given user account, the user has to be fully authenticated 170 (FIG. 1) for the account. The prospect of cases of a valid user having to a reset one's graphic pattern-based password without being able to login to one's account are effectively eliminated per the user online behavior based, authentication challenge adjusting methods as described in the following, and as illustrated in FIG. 5. As such, there is no particular need for convenience or productivity for handling any unexpected cases where valid users would have to reset their passwords due to inability to produce their graphic pattern based passcodes, and accordingly, high security measures, even at expense of user convenience, can be justifiably implemented for any occurrences of an actual valid user having to reset one's graphic pattern-based password while being logged out from one's account. Such user authenticity validation measure can include, for instance, requiring the user to answer sufficiently correctly and timely questions concerning system-recorded past activity at one account, circumstances of the account and previous passcode creation etc., where the answers are not specifically recorded anywhere, but are derived by the authentication system based on account operating data existing in various logs etc.

(B) Authentication:

In a basic scenario, the authentication system, as illustrated in FIG. 1, requests a returning user (i.e., a user already registered per the previously described sub-process), once having verified 150 that the entered UID exists in the database 270, to provide one's registered user ID, and, in response, the system prompts the user to produce the graphic pattern associated with that user ID using a to-be-colored matrix e.g. per the model of Table 1 (of appropriate dimensions), and requires 160 a match to treat the user as authenticated 170. If the color matrix pattern involves a series of a number (e.g. four) matrices, then, in the basic scenario (e.g., the initial login by the user), a match is requested and required for each matrix entry in the series (each starting with the to-be-colored matrix). Note that according to at least some embodiments, the authentication system will have the user produce one's graphic pattern even if the user entered a non-registered user ID, and in response to any invalid user ID and graphic pattern entry, simply report that the entered user ID and graphic pattern do not match any records.

At the authentication system logic operation level, whether a match exists (or a level of match that may exist, for scenarios discussed in the following) is determined by converting the graphic pattern produced by the user (in response to the system's request) into its corresponding digital vector representation, through converting the user's color choice for each given element in the graphic pattern to its corresponding digital code per the encoding table used (e.g., for hexadecimal codes: pink=0, red=1, orange=2, yellow=3, lime=4, green=5, turquoise=6, blue=7, violet=8, copper=9, gold=A, beige=B, brown=C, black=D, gray=E, white=F), and checking whether such element-specific color codes (e.g. hexadecimal numbers) resulting from the graphic pattern entered (or chosen) by authenticating user match the corresponding element-specific codes of the passcode stored by the authentication system for the provided UID. For clarity, assuming the graphic pattern (using a template of an 11-by-11 color matrix with 16-color encoding per above) stored for a user ID firstname_lastname@domainname.postfix had the 2nd element of the 4th row colored green, the corresponding 35th (3*11+2=35) hexadecimal digit in the expected correct passcode for that UID is 5. Conversely, if the 34th hexadecimal digit for that passcode was C, the expected correct color for the 1st element of the 4th row of the 11-by-11 matrix to be colored by the user being authenticated is brown.

In certain more advanced scenarios, in case the authentication method uses a series of color pattern matrices, if the system detects the user as a likely valid user (for instance, the observed online behavior characteristics of the login attempt are in the expected range, e.g., the user is on a known, expected login device and IP address for the UID etc.), the system will allow the user, if so preferred, to select which pre-colored matrix of a number (e.g. 16) of alternative matrices would best match the user's actual matrix for a given stage in the series, and after each successful selection, continue asking the user to select the best of the alternative pre-colored matrices for the other stages in the series; after an unsuccessful selection, the system will require the user to enter the exact matching color patterns for each matrix for that login attempt, with a limited number of attempts and/or time per a stage. Conversely, based on the user's correct entry or selection of a number of color matrices in the sequence deemed by the system sufficient for the detected circumstances of the login attempt, the system can skip requesting the user to enter or identify the remaining color matrices in the user's authentication matrix sequence.

In certain configurations, the authentication system forms a risk score regarding any given login attempt and determines the appropriate level of authentication challenges based on the risk score for the current login attempt. In some configurations, instead of a risk score, the authentication system maintains a validity or correctness score for the given login session such that reflects a level of match (rather than a mismatch) of the present online-session login activity of a login candidate with the historical login behavior characteristics of the authentic user for the given user ID; however, these two forms of security-level scores are effectively inverses of each other, and other than accounting for the opposite semantics (i.e. high risk score corresponds to low validity/correctness score, and vice versa), such different forms of login activity security score can be used in a similar manner and for same purposes, e.g. as described herein using examples that use the risk score semantics. For instance, the risk score could be 0 for a login attempt that matches exactly the expected characteristics of the typical login behavior of the authentic user for the entered user ID, while the risk score would increase based on any observed deviations from the expected characteristics of the login behavior; such a risk score could, by default, start from a mid-range for the possible values of that score, and be adjusted up or down based on how well the observed online behavior of the user matches the expectations for that user ID. Factors of the user's online behavior impacting the risk score for the given login attempt can include, e.g., the levels of (mis)match between the login-candidate user's keystroke pacing pattern of typing the given user ID and the stored model pattern (time gaps between the different keystrokes etc.) for that user ID, as well as the observed login device, location, and IP address of the login attempt and the corresponding expected types and values (or ranges) for such online session characteristics stored in the authentication system for that user ID, based on known valid login sessions.

Naturally, the better the match of the factors per above, the lower the relative risk score will be for that login attempt, and conversely, the greater the mismatch between such observed and the stored model characteristics of the login behavior for a given user ID, the higher will be the relative risk score assessed to that login attempt by the authentication system. In certain configurations, the risk score of a given login attempt can be adjusted also while the login candidate is producing the authentication challenge (sign-on graphic pattern) elements requested by the authentication system—for instance, the risk score can be increased based on the user candidate taking longer to produce a required graphic pattern than what is the stored model value for such time period for the authentic user of the provided user ID; on the other hand, in case the login candidate is able to produce the requested graphic pattern elements quickly, the risk score of the present login could be reduced.

The ways that the assessed risk score of the login attempt can be used to adjust the challenge level for the given login procedure can include, according to embodiments of the presented authentication system, for instance:

determining whether the user is required to produce, from scratch (e.g. empty, to-be-colored matrix), the full graphic pattern passcode for the provided user ID, or is allowed to select from a varying amount of alternatives, the graphic pattern best matching the correct pattern stored for that user ID (for a descending level of risk score and authentication challenge), in cases when the user's graphic pattern based passcode involves a series of graphic patterns, varying the number of graphic patterns, from the stored full series of e.g. ten of such patterns entered by the authentic user when registering or changing one's passcode, that the login-candidate user is requested to produce, either by entering them from scratch, or by selecting the best matching graphic pattern from a set of alternatives (e.g., with lesser number of patterns in the series required for a lower level of authentication challenge and lower risk score assessed for the present login attempt), as well as, varying the required level of match between user's entry or selection of the graphic pattern (e.g. color matrix) and the actual graphic pattern-based passcode stored for that user ID (with greater accuracy of match required for a higher authentication challenge level and risk score).

What herein is referred to as the best matching matrix from the alternative color matrices displayed to the user, in typical configurations, is any such alternative pattern that has least total variation from the user's actual color matrix, with each cell of differing color cell counting as one count of variation. In some configurations, such counts of variation are further weighted depending on the spectral distance between the color selections for a given cell in the user's actual color matrix—and the given alternative color matrix, e.g. such that red and orange, as well as orange and yellow, are at distance of 1 from each other, while red and yellow at distance of 2. In such weighted variation assessment scenario, an alternative matrix mistaking two red cells in the user's actual matrix for yellow cells gets a variation count of 2+2=4, while another alternative matrix mistaking three red cells in the user's matrix for orange cells gets a variation count of 1+1+1=3, such that the latter alternative (if both were otherwise identical with the user's actual color matrix pattern) would be deemed the best match among these two alternatives. Further, in some configurations, the system will, at least when the login attempt circumstances are detected as sufficiently low risk, accept user's selection of any of the provided alternative color matrices with a total variation count less than a defined threshold value from the user's actual color matrix pattern for that stage of the authentication.

The semi-randomization of the alternative patterns offered for user's selection can be done e.g. so that the actual pattern will not stand out in contrast to the other alternatives, while the alternative patterns are not centered around the actual pattern either. For instance, the system can move significantly away from the user's actual patterns along two or more degrees to create a modified color matrix pattern, and create random modifications centered around such a significantly modified pattern, and do so for e.g. two or three significantly modified patterns. Yet, approximately one half of the alternative patterns could be created by starting from a truly random initial color pattern, which however has a memorizable structure, and creating systematically and randomly altered versions of that truly random starting pattern.

The system's ability, in conditions detected as sufficiently safe, to allow the user to select its pattern(s) matching best its actual color matrix pattern(s) from a set of alternatives, along with the capability to use a potentially variable-length series of color matrices for authentication allows achieving both a sufficiently user-friendly, efficient and highly secure online user authentication process. Notably, the described capabilities to use sequences of graphic patterns for user authentication, as well as the capability to request the user to select best matching patterns from semi-randomized alternatives, provide protection against so-called "shoulder surfing" i.e. attempts by another human user to learn the first user's passcode generating graphic pattern; with the described techniques, the other user will not likely ever get to see and memorize the first users' full and exact graphic pattern sequence that would be needed to login from another device and/or under otherwise differing circumstances (e.g., differing key stroke pacing detected by the system when entering the user ID, etc.).

Considered at a more general level, according to at least certain embodiments, the authentication challenge level adjustment system operates with the following principles:

In response to defined, monitored characteristics of online behavior of the login candidate, e.g. the user ID typing charactering pacing pattern, deemed to sufficiently match the record models for the entered UID, instead of requiring the user to create one's color matrix from a blank slate (which is the default operation in case of insufficient match), the logic of the system directs the user to select from an array of pre-colored matrices a sufficiently closely matching matrix to the actual color matrix for that UID. Further, certain embodiments, rather classifying the login candidates' online characteristic (e.g. UID typing pattern) either as a match or non-match, in order to determine whether the candidate is allowed to select an appropriate matrix from arrays of alternatives rather than being required to fill out the color matrix from the blank slate, the logic of the system may compute a score representing a degree of mis-match between the present login session and the recorded models for the given UID, and use such mismatch score to set the level of appropriate login challenge for the given candidate. Besides the behavior of, at values of the mismatch score exceeding a set threshold, directing the login candidate to produce the correct color matrix from a blank slate, at a lower scale of the mismatch score, various embodiments of the authentication method respond to an increased value of the score by adjusting the level of authentication challenge e.g. as follows:

- by increasing the number of pre-colored matrices in the array (menu) from which the login candidate is to select a sufficiently closely matching matrix;
- by increasing the number of successive menus from which the candidate is to select a sufficiently closely matching matrix;
- by reducing the amount of time in which a sufficiently closely matching matrix needs to be selected by the candidate, and/or
- by decreasing the # of matrices considered sufficiently close to the user's actual matrix.

Some embodiments may, after a user's successful entry and/or selection of color matrices corresponding to the UID and before logging in the user, additionally require the user to correctly answer an operational question to which the authentication system (e.g. through deriving it from the authentic user's online activity) as well as the valid user readily know the answer at least approximately, but which has not been stored anywhere and not sent over a public network, e.g., approximate or average times, frequencies, or durations of past login/logout sessions/events, or the expected login session this time, etc. Additionally, or alternatively, the authentication system can query the user for information not available to parties without the authorizations tied to the present UID (when that user would be considered fully authenticated). The system may allow the user to select the best or any acceptable answer to such further authentication questions from a set of alternative answers or ranges, but give only a limited and short time to answer, in order to validate whether the user attempting to login is the real owner of the account for the provided UID.

According to certain embodiments for providing an adjustable level of authentication challenge, FIG. 5 illustrates a flow diagram of main procedures for adjusting the login challenge based on a measure of difference between observed and expected values of a defined set of online behavior features of a login candidate, according to an example embodiment of the disclosed authentication system.

In FIG. 5, for the logic of the authentication system a set of features are defined that are to be collected 210 for any new login attempt to the domain protected by the authentication system. In various embodiments, such features to be collected for a given login session can include, e.g., the user device and operating system specifics, web browser make and version, network (e.g., Internet Protocol) addresses or other network communication attributes, browsing history (e.g., referrer site), UID typing (e.g. key stroke time intervals) and mouse operating (movement, clicking) patterns of the given login candidate, referred to herein as a user. The observed values of the defined set of features to be collected for any incoming user will form the components of a characterizing feature vector 205 (FV) for the given user, noting that some of the FV components (e.g., UID typing pattern) can themselves be vectors of values (e.g., milliseconds between key up events in the typing of the UID). The values of user FV components can, in embodiments using typical computer and web technologies, be obtained by functions and features of web browser (client) and server side scripting languages, e.g. JavaScript and its variants and extensions (including, for example, Node.js), PHP Hypertext Preprocessor (PHP), etc., and their equals, successors and so forth.

Once the FV for the entered registered UID is thus populated, the authentication system will query 215 a database 220 for FVs of UIDs to obtain the FV information for the UID of the query. Assuming the UID is registered with the login system, the database 220 system responds with the FV information for the queried UID, along with, in at least some embodiments, corresponding FV information for representative other potential users, where such the FV information for other users can be based on either FV component information of representative sets of anonymized real users, or be synthesized e.g. via averaging, randomizing etc. the values of FV components of the registered and/or test users. The applicable design principle is that the FV information for the users other than the queried UID should, at least approximately, correspond to the FV of typical users, such that the FV 205 of an unauthentic login candidate will more likely resemble the FV information of the other users than the UID entered. In the embodiments described in the following in further detail, the FV information for the UID subject to the database query 215, as well as the corresponding FV information for the other (real or synthetic) users, that is returned 225 in response to the query include a defined number of individual FVs, e.g., twenty FVs most recently recorded for the UID of the query and labeled as such (e.g., with an associated FV component, representing whether the given FV matches the provided UID, set to value '1'), along with twenty FVs corresponding to other users also labeled accordingly (e.g., with the FV component representing whether the given FV matches the provided UID set to a value '2' or greater, other than the value denoting a case of unlabeled FV). Naturally, in case the database system 220 did not contain an entry for the UID of the query 215, the response 225 will so indicate, to signal the login system to direct the user to either enter an actually registered UID or get registered with the UID. Moreover, in case the database contained less than the defined number of FV recordings for the entered UID, at least in some embodiments, the actually recorded FVs for the UID will be complemented by repeating such recorded FVs, starting from the most recent FV recordings, until the defined number of (e.g., twenty) model FVs for the UID is reached. Further, in such scenarios, certain embodiments, rather than repeating (a small number of) actual recorded FVs, will complement them by including in the number of model FVs for the queried UID slightly modified versions of the existing FV recordings, e.g. by incrementing or decrementing the individual FV components values of the individual FV recordings by random values that are small compared to the corresponding actual recorded values.

Assuming the database system 220 did return the given query 215 with a response 225 populated with FV information for the (registered) UID entered by the given user, the next step 230 in the authentication level adjustment process of FIG. 5 is to add to such response, including the respectively labeled collections of (a) the model FVs for the given user and (b) alternative FVs representing other (real or synthetic) users, the unlabeled FV 205 of the present login attempt, and send such batch of FVs to an artificial intelligence (AI) engine 240 as a classification (and potentially, risk scoring) job. To denote the present FV as unclassified, it can be labeled with a value reserved for that purpose, e.g. '255'. Note that, in case the database 220 did not yet contain the defined number of recorded FVs for the queried UID, various embodiments may use logic provided in functions related to sending 230 the job to AI engine, or at a preprocessing stage of the AI engine 240, rather than with the database 220, to complement the number of actually recorded FVs for the given UID to reach the defined number (e.g., twenty) of model FVs for the UID.

Among the batch of FVs sent 230 to the AI engine 240, the collection of the alternative FVs can in certain embodiments include a common collection of model FVs stored for UIDs other than the entered UID, FVs recorded for login attempts determined to be unauthentic for whatever UID (registered or not) entered, as well as FVs synthesized based on such FVs for unauthentic login candidates for the entered UID. In other embodiments, that collection of the alternative FVs representing unauthentic login attempts for the entered UID will include defined (including accordingly labeled) subsets at least for the cases of FVs that are based on (i) model FVs stored for other UIDs, and (ii) FVs recorded for login attempts determined to be unauthentic (for whatever UID entered). As a general condition, to deem the present FV 205 as more likely a match with model FV(s) stored 220 for the presently entered UID than the alternative FVs, the logic 250 at the AI engine should determine whether the present FV is closer to the model FVs for the entered UID, than to the alternative FVs, including to any of the defined subsets among the alternatives, included in the batch job provided 230 to the AI engine 240. In the herein considered example embodiments, the logic 250 uses a measure of vector distance as a basis for assessing the relative closeness of the present FV with the model FVs for entered UID as well as to the (subsets of the) alternative FVs. In at least some of such embodiments, such a vector distance measure is taken between the present FV and the average vector of the alternative FVs, and any defined subsets of the alternative FVs.

In certain embodiments however, the determination 250 of whether the present FV sufficiently closely matches the model FVs for the entered UID is based on the vector distance between the present FV and the model FVs stored 220 for that UID, with, at least in some of such embodiments, the model FVs represented for such calculation as their average vector. In some of these embodiments, the present FV is classified 250 as a match if such a vector distance measure between the present FV and the model FVs of the UID is less than a set threshold, and otherwise as a non-match. Yet in some embodiments, that vector distance measure is taken to represent a risk score for the likelihood that the present login attempt is unauthentic.

Embodiments of the AI engine 240 discussed herein in greater detail will, for a given incoming job 230, at its initial phase 250, classify the unlabeled FV 205 of the present login attempt as either a match or non-match compared with the model FVs for the present UID, which, following the logic operation per the foregoing, are labeled with '1' for their component representing whether the present FV matches the provided UID. Such classification, or scoring when a finer granularity is relevant, in some embodiments, can be done based on techniques per the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020, where the batch of FVs in the given classification job operates as a (mini) stream, with the labeled match and non-match FVs functioning as training objects, based on which the unlabeled present FV 205 (the final object of such mini-stream) is labeled by the classifier 250.

In the case of non-match classification 250 for the FV 205 of the present login session, embodiments of the logic of the adjustable authentication challenge system described here in detail will direct the user to produce 280, from a blank slate, the graphic pattern, assumed here to be a color matrix, used to generate the passcode for the UID. Along that branch of the system operation, the challenge-stage 295 of the login system will test 280 whether the color matrix thus produced by the user, referred to as a trial matrix, matches what is registered 270 for the entered UID. In case yes, the user is considered authenticated 170, and otherwise not 180. Naturally, the logic for testing 280 whether the graphic pattern produced by the user matches what is expected for the entered UID will, in various embodiments, operate on various levels of representation of information for the color matrix. For example, in certain embodiments, the logic 280 will compare whether the respective outputs of a defined hash function for the registered and the trial color matrices are equal.

Though hash functions as such are not a topic of this disclosure, the hash functions for purposes of this description are any such hash function that, while not allowing to reproduce the input value from its output value, will produce any particular output value for a singular input value, with the values operated upon being integers in defined range. That way, if the hashed values of, for instance, the respective hexadecimal vector representations of the cell colors of the registered and trial color matrices are equal, the test function 280 can conclude that the present user did produce the color matrix that was registered 270 for the entered UID, and can deem the user as authentic 170. Such an approach provides a security advantage via databasing 270 and returning 275 hashed information for the users' color matrices, instead of information that would as such correspond to the specifics (e.g., cell color choices) of the users' color matrices. The function of hashing of the passcode information for storing 270 at the server is to be done at the server side, to ensure that the challenge logic 295 (also executing at the server side), testing whether the passcode representation based on the trial matrix matches the corresponding representation of the matrix registered 270 for the entered UID, actually receives the passcode as produced by the proper client script for generating a passcode based on the user's color matrix entry, rather than a (stolen) copy of the hashed passcode stored 270 for the given UID. Note further that the client side code, besides encrypting the graphic pattern based passcode for transmission to the authentication server, will, at least in certain embodiments, further perform a preliminary hashing of the passcode, to destroy information for the generating graphic pattern already from the input to the encryption function, to provide protection against a possibility that the encrypted passcode could be decrypted, e.g., via an unauthorized party gaining access to the private key the authentication server uses the decrypt message from the client. In any case, the web login session, and all client-server communications, between the client scripts executing at the user device and the server storing authentication information 220, 270 for the UIDs, is to be appropriately protected against all forms of access by unauthorized parties, e.g. using asymmetric encryption of protocols such as HTTPS and/or a VPN, to ensure the server (storing information 220, 270) and the client (producing the color matrix entry based on user input, and the corresponding passcode) in fact are communicating directly and exclusively with each other. These principles, though mentioned here explicitly, applies for all forms of storing and exchanging of sensitive information between the client and the server in all scenarios of the login (including registration and all branches of the authentication) processes, according to embodiments of the graphical passcode generation and authentication methods described herein in detail.

Moreover, in at least some embodiments, the hash functions per the foregoing will take as the function input, rather than the plain hexadecimal representation of the given color matrix, a 'salted' version of that hexadecimal representation modified by defined information concerning the associated UID, e.g., through XOR function based on the binary values of the characters of the UID and binary values of the characters of hexadecimal codes of the color matrix cells, with for instance repeating the characters of the UID to cover the length of the matrix hexadecimal character vector. Using such salting techniques, even if color matrices registered for different UIDs were identical, their respective hashes will be different, given that the UIDs will be unique, and similarly, even if it was known that the registered 270 hashes for certain UIDs are the same, the color matrices required 295 for successful login would still be different, thanks to the salting of the hash inputs with the unique UIDs. Further, in at least some embodiments, before hashing the salted passcode, the character string used as the salt, e.g. the UID, is hashed by some further hash function to protect the salt needed for hashing the passcode.

In the case of match classification 250 for the present FV 205 with model FVs for the entered UID, as the next phase 260 for setting an appropriate level of login challenge, the AI engine will compute a metric representing a level of deviation of the present FV 205 from what was expected for the entered UID based on the FVs recorded 220 for that UID, to be used as risk score for the present login session. In at least some embodiments, such risk scoring of the FV of the present login attempt can be done using the techniques per the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020, for instance, based on an absolute value of a vector difference between the present FV and a model FV computed as an average of FVs recorded for the given UID. Such a risk score thus assessed 260 by the AI engine 240 for the FV 205 of the ongoing login session will, in turn, according to herein described embodiments of the login system, be used to adjust the level of complexity presented for the user at the challenge-stage 295, e.g., using techniques listed in the foregoing, such as, varying the number of successive menus of pre-colored matrices from which the user has to select a sufficiently close matching matrix to actual color matrix registered 270 for the entered UID. In such embodiments, assuming each of the menus, from which the user (classified 250 as a match) is to select a pre-colored matrix sufficiently close to the actual matrix of the UID, contained a fixed number, such as sixteen, matrices, while the number of matrices deemed sufficiently closely matching per menu was set to two, the potential value range for the computed risk score could be divided into subranges that correspond to their respective numbers of consecutive matrix menus to be correctly answered by the user. For instance, if the potential range for the login attempt risk scores was from 0 through 1023, the login system could map the risk scores up to 255 to three of such menus, the scores from 256 to 511, to four, and the scores greater than 512, to five or such successive menus (respectively letting 0.2%, 0.02% and 0.003% of login attempts, whose FV information sufficiently matched the FV information registered for the entered UID, through simply by chance). If a given user (with FV 205 sufficiently matching FVs recorded 220 for the entered UID) selected, for each of the menus of alternative matrices thus provided as a login challenge, one of the matrices deemed as sufficiently close to the actual color matrix of the entered UID, the logic 290 of this branch of the challenge-stage system will consider the given user as authentic 170, and otherwise as unauthentic 180. In at least some embodiments, the feature of having the user answer a given menu of alternative pre-colored matrices for the user's selection is implemented by having the, e.g. sixteen, color matrices of each menu identified with serial numbers e.g. from 0 to 15, such that the user is to type the serial number of the matrix being selected from the given menu; that way, the user's selection of a matrix from a given menu is better protected against shoulder surfing than e.g. a mouse-based selection.

The production of the menus of alternative color matrices, from which the user is requested to provide an answer identifying a matrix sufficiently closely matching the actual color matrix of the UID, for the step 290 of FIG. 5 can be done, for example by applying the principles described in the foregoing, concerning semi-randomization of the alternative patterns offered for user's selection. In at least some embodiments, the code for producing the array of alternative pre-colored matrices for the menus will run partly on the server side, where the stored 270 information for registered color matrices for the UID resides, and partly on the client side, e.g., on the user's web browser. In embodiments considered here in greater detail, the non-hashed information at database 270 for producing variants of the color matrices for any given queried 275 UID is encrypted, such that with a protected key it can be decrypted when needed for a challenge-test 290 involving menus of alternative color matrices.

In such embodiments, the server-side database 270 will hold and in response to queries 275 return to the menu-based challenge-stage 290, for a given UID entry, information for the corresponding registered color matrix that the client side code for the login application is to process, along with certain randomized dynamic information produced 275 by the server code for the present login session, in order to produce a seed color matrix for the (first) menu of alternative color matrices to be presented for the user. The mentioned dynamic information will cause the seed matrix produced by the client-side code to vary, even for the same UID, from one login session to another in a randomized manner.

Moreover, in some embodiments, the seed matrix per above will not be included among the (1st) menu of alternative matrices displayed to the user, but in place of it, a different matrix is included in the menu such that is varied in a different manner, even if for the same degree of differences, than the first mentioned seed matrix. In certain of such embodiments, to produce the mentioned different matrix, which will be (like the actually hidden seed matrix first mentioned would have been) among the displayed matrices of the menu the one closest to the actual color matrix registered 270 for entered UID, the server will include two, different pieces of dynamically generated information in returning 275 queries for information for the color matrix registered for the given UID; one piece of dynamic information for creating the hidden seed matrix, and another creating its variant that will be the closest matrix of the (1st) menu compared to the actual matrix registered for the given UID. Alternatively, the mentioned second piece of dynamic information can be generated on the client side either randomly or based on the dynamic information included in the response 275. Such techniques, and variations thereof, can be used to prevent an unauthentic user, assuming such an attacker actually was able to produce through one's online session characteristics a FV 205 that sufficiently matches what is expected for the entered UID, from deducing which of the displayed alternative color matrices most likely is the one closest to the actual color matrix registered 270 for the entered UID. Moreover, in certain embodiments, the logic of the authentication system requires the user to produce the requested color matrix, including when selecting from a menu a color matrix sufficiently close to the one registered for the entered UID, within a set time limit, e.g., number of seconds adjusted (inversely) based on a metric of difference between the FV 205 of the present login session and the average of the model FVs recorded for the entered UID; without such a timely response, the login session times out the user. Further, various embodiments will accumulate various forms of scores for login attempts for any given entered UID that are not timely successfully completed, whatever the branch of the login process being followed (e.g. whether the authentication logic classified 250 the UID entry pattern as a match or non-match), and, in case such a score for unsuccessful login attempts would exceed a defined threshold (e.g., 3 consecutive login attempts without a timely success), restrict or block login attempts for that UID and freeze the associated user account, until a login candidate for the given UID would answer correctly further security challenges such as those required for a password reset, after which the system may require the user to change one's login graphic pattern in any case. Such techniques, and variations of them, can be used as further protection against attempts by unauthorized parties to deduce which of a menu of color matrices is closest to the one registered for the entered UID.

Further, in embodiments where a metric of difference for the user's selection of a color matrix is computed, e.g., to determine whether the matrix selected is sufficiently close to the correct matrix, or to keep an accumulated mismatch score for the login session, the logic of the authentication method will compare the matrix selected by the user with the actual matrix registered 270 for that UID, so that the closeness of the user's selection from a matrix menu is compared against the original matrix registered for the entered UID, rather than a variation from it (e.g. the above mentioned seed matrix, or its displayed variant). The metric of difference per above, for the matrix selected by the user, can be computed by accumulating an incremental value for each cell of the selected matrix that has a color different than the corresponding cell of the matrix registered for the entered UID, and in some embodiments, such an incremental value per a differing cell can furthermore vary according to a measure of color spectral difference between the colors of the given cell in the selected and the registered matrices.

In such embodiments, as described here in greater detail, at least some of the rest of the alternative color matrices for the given menu are based on semi-randomized matrix cell color (including matrix default color) variations from the first mentioned seed matrix, and any other alternative matrices can be randomized variations from an independently created secondary seed matrix, which would be typical among the matrices registered for the users. The subsequent menus of alternative color matrices, are randomized reproductions of the initial menu that will, in case the user answered the preceding menu correctly, keep using the original seed matrix as the primary seed matrix, and otherwise, will use the user's matrix selection at the preceding menu as the primary seed matrix.

Notably, neither the information stored 270 at the server side for the given UID color matrix, nor the initial seed matrix constructed at the client side, correspond directly to the actual color matrix registered for the given UID. The same is generally true also for rest of the alternative color matrices of the menus that are randomized variations from the primary as well as any secondary seed matrices. Thus, the system avoids storing or exchanging information, even under encryption, from which the color matrix registered for any given UID could be derived. The menu based challenge logic 290, in some embodiments, will also place the matrices of each menu produced, including the seed matrix and the randomized variations based on it and any alternative seed matrices, in randomized order on the matrix arrays of the menus, however noting the actual serial number of the seed matrix, and that of the set number of sufficiently close variations of it, to test 290 whether the user's answer to the given menu (typing of the serial number of the selected matrix) corresponded to one of the matrices deemed sufficiently close to the color matrix registered for the UID. Naturally, such a test 290 is meaningful just so long as the user has answered each of the preceding menus (if any so far presented) correctly; otherwise, i.e., following any wrongly answered menu, though the presentation of the menus of alternative matrices for the user will continue through the set number of menus for the login attempt, the use will be deemed unauthentic 180 regardless of the subsequent menu choices. However, in cases where the user does answer each of the set number of successive alternative matrix menus correctly, by typing the serial number of one of the sufficiently close variants of the initial seed matrix for each menu presented, the menu based challenge logic 290 will deemed authentic 170.

In certain system usage scenarios, the access controlled domain, protected using the authentication methods per this disclosure, will ascertain the true state of authenticity of the login candidates thus deemed as authentic 170 or unauthentic 180 by the procedures per the foregoing, and accordingly provide control feedback to the AI engine 240, e.g., per feedback techniques taught in the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020. Some usage scenarios will further utilize the charging and crediting mechanisms of the aforementioned related applications, based on correctness of the login candidate authenticity classifications 170, 180 compared with the ascertained authenticities of the login attempts.

In the operating scenarios discussed herein in greater detail, once the access controlled domain has ascertained a given login attempt, classified as authentic 170, to truly be authentic, it will signal the authentication system per FIG. 5 to store 220 the FV of that attempt among the active model FVs for the associated UID. In case the database 220 already had the configured maximum number, e.g. twenty, of active model FVs stored for the given UID, this newly ascertained authentic FV is to replace the oldest of the existing model FVs. To support such operation, the system per FIG. 5 will keep, until a set limit of time and/or a set number of FV recordings, the FVs of login attempts deemed as authentic 170 as candidate FVs for their associated UIDs, and move such candidate FVs to actual model FVs stored 220 for their UIDs based upon receiving a confirmation of ascertained authenticity of the associated login session from the access controlled domain. Note that the above operation will function also for new users, such that even when there isn't yet a sufficient number of recorded 220 FVs compared with which to classify 250 the present FV 205 as a match, assuming the authentic user however is able to correctly reproduce 280 one's color matrix, the system will nevertheless deem the user as authentic, such that the access controlled domain will get to signal, assuming the user is ascertained to truly be authentic, the authentication system to store the associated FV as a model FV for the provided UID.

Moreover, in scenarios capable of ascertaining the actual authenticity of the login attempts deemed as unauthentic 180, the authentication system per FIG. 5 can be signaled to store the FV of such login attempt deemed unauthentic, in case it was ascertained to truly be unauthentic, in a bank for model FVs for the non-match FVs, which are to be used for collection of non-match FVs in the jobs 230 sent to the AI engine 240. Further, in such cases, when a login attempt deemed as unauthentic 180, but was ascertained to actually be authentic, the FV of also such a login attempt is to be signaled to be stored 220, by the authentication system per FIG. 5, as a model FV for the entered UID. Naturally, to support this operation, the system per FIG. 5 will store as candidate FVs for their associated entered UIDs also the FVs 205 for login attempts initially deemed as unauthentic 180, so that also such candidate FVs can be stored as model FVs for their associated UIDs in database 220, to be used among the match-collection of FVs in the jobs sent 230 to the AI engine 240.

Note further that, in some embodiments, the authentication system per FIG. 5 will, in case the FV 205 of a given login attempt was classified 250 to sufficiently match the expected models 220 for the entered UID, produce to the domain protected by this authentication system, as an alternative or in addition to the classification of a given login attempt as authentic 170 or unauthentic 180, the mismatch score value computed 260 for the present login attempt. In certain embodiments, that mismatch score could be, for example, an integer in the range [0, 100] representing the percentage likelihood that the present login candidate is unauthentic; e.g., a score value of thirty would signal that, among one hundred login attempts each having mismatch score of thirty, thirty can be expected to be unauthentic, and seventy authentic. In at least some of such embodiments, the mismatch score computed 260 based on difference between the present 250 and recorded 220 FVs for the given UID, will be further adjusted based on the differences between the color matrices selected by 290 and registered for 270 the given user. Embodiments providing that type of a mismatch score (per above, e.g., computed 260 for login attempts sufficiently matching 250 the models registered 220 for the entered UID, and potentially adjusted through comparing 290 the user's color matrix selections with the correct ones), along with or in place of the authenticity classification 170, 180, to the domain protected by the authentication mechanisms per this disclosure, can use the value of such a mismatch score to adjust a level of further challenges made for a given user within that domain, to control a level of resource access etc. authorization granted to that user. For instance, before allowing a user, classified as likely authentic 170, e.g. to edit data records at the domain, the further challenge logic within the domain may, depending on the mismatch score, require the user to answer sufficiently correctly and quickly operational security questions which only the authentic user would readily know. In such operating scenarios, even if a given login attempt is deemed more likely authentic 170 than unauthentic 180, the higher the mismatch score computed for a given login attempt is, the higher the appropriate number of the further challenge questions or difficulty level of other challenge tests, and/or the lesser the tolerated level of inaccuracy or time permitted for the answers thereof, should be, before authorizing the given user to access resources at the domain protected per the disclosed authentication methods. In addition, in at least some operating scenarios, the appropriate degree of further challenges presented for the deemed authentic 170 user will furthermore depend on the sensitivity of information the given user seeks to access, the risk potential of the action the user seeks to conduct, etc., and/or on the observed ongoing online (including, intranet) behavior of the user.

A possible, basic mode of using an embodiment of herein described graphic pattern-based passcode generation and authentication methods is as follows: a client program on a mobile device or personal computer generates a high-strength digital passcode (e.g. 11*11=121-character hexadecimal number, for an 11-by-11 matrix colored by the user) for an anonymous user based on the user's edition (later on, potentially, selection) of a graphic pattern memorizable to that anonymous user, which the user can copy-paste (the actual passcode being encrypted in transit) to the regular login prompt requiring a complex text-based password, along with the user ID (which was not known to the application program generating the passcode based on graphic pattern editing of the user staying anonymous to that program/service). Here, the text-based password to be entered on the login prompt is to be understood as a string of hexadecimal digits, which each convert to a 4-bit binary code, e.g. a substring of 1A (for a pair of matrix cells colored red and gold, using the mentioned 16-color encoding scheme) would correspond to bit vector sequence of 0001_1010.

More advanced login prompts, requiring long passcodes (e.g. 121*4=484 hexadecimal characters, based on a user's selection of series of four 11-by-11 color matrices), may provide higher level of integration and automation such that the user gets to produce its graphic pattern based passcode while seemingly staying with the regular login page of the user account protected by an embodiment of the herein described access control method enforcing and facilitating strong-password usage (entropy level of 5*11*11*log 2(16)=2420 bits based on a series of five 11-by-11 16-color matrices).

For a straightforward interoperability with conventional login prompts expecting a password of e.g. between 8 to 128 ASCII characters, the graphic pattern (e.g. color matrix) based passcode generation per this description can include steps to produce, from the hexadecimal character string reflecting the user's color choices for the matrix cells as well as e.g. user ID and/or other user-specific data (for instance, the password-generator system internal user serial number), an ASCII character based hash code of defined length, using a one-way hashing function (e.g., Secure Hash Algorithm (SHA-x)) that produces a fixed-length (e.g. 256 byte) hash code from a given source string. The hash code production can further be set up such that the fixed-length hash code will include at least a desired minimum number of non-alphanumeric ASCII characters (e.g., !, @, #, $ etc.). Moreover, in usage scenarios allowing to copy-paste the password to the conventional login screen, the graphic pattern based passcode generation method per this description can allow the user to copy-paste the generated, hashed passcode from the passcode generation application/applet (e.g., a pop-up window) to the password field of the conventional login page, and if supported by the conventional login prompt, such that the hashed passcode stays masked (displayed, e.g., as a string of black balls on password fields) from the user, as well as from any other potential viewers. Further, when the graphic pattern based passcode generation executes locally at the user device, e.g. on the user's web browser (for example using JavaScript or similar techniques), the users' password, in any form, either as a graphic pattern, its hexadecimal character vector representation or as the resulting fixed-length hash, will not be stored or transmitted anywhere such that it could be intercepted by an unauthorized party. Accordingly, using embodiments of systems and methods per this description, the user can conveniently produce a strong-security (cryptic, non-dictionary-word based) passcode that will directly work for conventional login prompts expecting passwords including e.g. 8 to 128 ASCII characters, such that the user will not need to remember, and in fact, will not necessarily ever see or even know what the password is, as well as that, in all its forms, from the source graphic pattern to the hash code ASCII password—including before transmission as encrypted along with the login user name (and other user login info) for the given strong-password protected application, server or system—stays inaccessible to any unauthorized actors.

Moreover, in at least certain embodiments per FIG. 5 and related descriptions, the password text field of conventional login screens is made unnecessary, and eliminated, by the described graphic pattern based password generation and authentication mechanisms, which, instead of requiring the login candidate (a user) to enter a traditional password string, request the user to reproduce the graphic pattern registered for the entered user ID, which the logic of the password generation and authentication system will automatically convert to a salted, hashed passcode, and compare that with the salted hash of the passcode stored for the given user ID, to determine whether the user is authentic. Moreover, as further described in reference to FIG. 5, in cases where the observed characteristics of the present login session sufficiently match what is expected for the entered user ID, the user is allowed to select one's graphic pattern from arrays of displayed alternatives, and the system logic will determine whether the alternative selected by the user is sufficiently close to the graphic pattern registered for the entered user ID, and if so, the system will consider the user as authentic, and otherwise unauthentic. Further, in such scenarios, in addition to the classification of the given login attempt as likely authentic or unauthentic, embodiments of the authentication system as disclosed can produce a mismatch score accumulated for the present login session, based on differences of the user login session variables and the corresponding recorded values for the given user ID, in order for the domain protected by the authentication system to accordingly present potential further challenges to the user (e.g. request specifics pertaining to the authentic user's activity within that domain), to determine appropriate authorization levels (if any) for the user.

Even if not explicitly mentioned in this description, in at least some embodiments, sensitive user information such as the user's password is asymmetrically encrypted for transmission between the client code (executing the graphical passcode generation applet at the user device) and the server code (executing the authentication logic), as well as is one-way hashed for storage at the server. The asymmetric encryption mechanism, e.g. PKI, is to ensure that the parties exchanging sensitive data can verify that they are communicating directly and exclusively with the intended, authentic counterparty. One-way hashing of the password information for storing at the authentication server is to eliminate any possibility for access to the original password from the stored information due to the one-way nature of the hash functions, such that information for the original password, or for the graphic pattern that would generate it, cannot be derived from the stored, hashed info. Moreover, unique information, called salt, is added to the original passcode for each user account before the hashing, to ensure the passcode hashes will be unique also for user accounts having the same passcode. The hashing of any given user's passcode is done by logic at the server side to ensure that the authentication logic (i.e., testing whether the hash of the passcode of a given login attempt matches the stored passcode hash for the given user account) receives for the given login attempt the (encrypted) passcode in the form it should be before the hash function applied for the passcode as stored at the server, rather than a copy of the stored hash of the passcode. And the encryption ensures that such a passcode received by the server-side authentication code for the given login attempt was actually generated by the unmodified client script for the graphical passcode generation sent to the user device from the authentication server. Collectively, these encryption and hashing techniques will thus enforce, as a condition for a successful login to a given user account, demonstration of knowledge of the original graphic pattern generating the passcode for the given user account, which graphic pattern, through the disclosed techniques, can be kept as a secret that is memorized, and safely and conveniently reproduced, just by the authentic user.

Generally, this description and drawings are included to illustrate architecture and operation of practical embodiments of the present disclosure, but are not meant to limit the scope of the claimed invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the innovations described herein.

Moreover, the system elements and process steps, though shown as distinct to clarify the illustration and the description, can in various embodiments be merged or combined with other elements, or further subdivided and rearranged, etc., without departing from the spirit and scope of the disclosure. Generally, persons of skill in the art will realize that various inventive embodiments of the present disclosure can use different nomenclature and terminology to describe the system elements, process phases etc. technical concepts in their respective implementations.

For instance, it will be readily understood that, while in the foregoing the graphic patterns are described as color-coded matrices, the selection of colors for the matrix cells can be substituted with alternatives such as selection of different symbols, pictures, shapes etc. for the matrix elements. Likewise, what is in the foregoing described as 2-dimensional matrix, can be substituted by alternative arrangements for visualization of the user-entered (and system-generated, semi-random alternative) graphic patterns. For example, the user's editing of the bordering shapes of the individual graphic patterns in a sequence of such patterns can be used to form the user-entered graphic pattern used to authenticate the given user.

Accordingly, from this description many variants will be understood by one skilled in the art that are yet encompassed by the scope of the teachings as set forth herein.

What is claimed is:
1. A user authentication system comprising:
   a login feature collection interface to collect a plurality of observable characteristics for a current login attempt by a login candidate, the current login attempt requesting a login for a given user identifier (UID) of a group of

UIDs for a login domain, the plurality of observable characteristics including information characterizing
the login candidate's interaction with a login interface of the login domain, and
at least one additional aspect of the current login attempt;
a login feature data store to maintain, for each UID in the group of UIDs, information indicative of collected observable characteristics from one or more past authenticated login attempts to that UID;
a trained artificial intelligence (AI) risk assessor to, based on the plurality of observable characteristics collected via the login feature collection interface and information maintained in the login feature data store indicative of collected observable characteristics from one or more past authenticated login attempts for the given UID, form an assessment of risk that the login candidate is unauthentic;
variable-challenge-level authentication challenge logic to interact with the login candidate, the variable-challenge-level challenge logic configured to
set, from among a plurality of different challenge levels, a difficulty of challenge level, based at least in part on the assessment of risk formed by the trained AI risk assessor for the current login attempt, and
interact with the login candidate to obtain one or more authentication responses corresponding to the set difficulty of challenge level to determine whether the login candidate is authentic for the given UID; and
an authentication data store to maintain, for each UID of the group of UIDs, at least one registered authentication item created for that UID from input from a respective authentic user of that UID, wherein
the at least one registered authentication item for the given UID comprises a registered graphic pattern, and
the plurality of different challenge levels comprise
a first challenge level that directs the login candidate to reproduce, from a set of basic elements, the registered graphic pattern for the given UID, and
a second challenge level that instructs the login candidate to select, from an array of alternative graphic patterns that excludes the registered graphic pattern, a pattern that is within a threshold difference of matching the registered graphic pattern.

2. The user authentication system of claim 1, wherein the information characterizing the login candidate's interaction with the login interface comprises device interface input timing and/or movement values collected proximate in time to the current login attempt.

3. The user authentication system of claim 1, wherein the at least one additional aspect of the current login attempt comprises at least one of hardware specifics for a computing device associated with the current login attempt, operating system specifics for the computing device, web browser identification, network address information, one or more network communication attributes, or browsing history.

4. The user authentication system of claim 1, wherein:
the information indicative of collected observable characteristics from one or more past authenticated login attempts comprises information from up to a selected threshold number of past authenticated login attempts for each of the group of UIDs; and
the user authentication system is configured to, upon successful authentication by the login candidate for the current login attempt, save information from the collected plurality of observable characteristics to the login feature data store for the given UID.

5. The user authentication system of claim 4, further configured to, upon unsuccessful authentication by the login candidate for the current login attempt, save information from the collected plurality of observable characteristics to the login feature data store for the given UID along with an indication that the saved information corresponds to an invalid login attempt.

6. The user authentication system of claim 5, wherein the trained AI risk assessor is configured to form the assessment of risk based further on invalid login attempt information saved for the given UID in the login feature data store.

7. The user authentication system of claim 1, wherein the at least one registered authentication item comprises one or more graphic patterns.

8. The user authentication system of claim 7, wherein each respective graphic pattern of the one or more graphic patterns comprises a configuration of plural spatially arranged elements, each of the spatially arranged elements having a color or other distinguishing feature selected from among a plurality of possible colors or other distinguishing features by the respective authentic user when creating the respective graphic pattern.

9. The user authentication system of claim 1, wherein the at least one registered authentication item comprises a hashed and/or encrypted passcode.

10. The user authentication system of claim 9, wherein the hashed and/or encrypted passcode is generated by the user authentication system from a graphical pattern created by the respective authentic user as the corresponding at least one registered authentication item.

11. The user authentication system of claim 1, wherein one or more of the plurality of different challenge levels comprises a third challenge level that directs the login candidate to answer one or more operational security questions
derived from past activity of an authentic user for the given UID, and
that an authentic user for the given UID would be expected to be able to answer at least within a defined level of accuracy and/or timeliness.

12. The user authentication system of claim 1, wherein:
the at least one registered authentication item for the given UID further comprises one or more alternative graphic patterns; and
one or more of the plurality of different challenge levels comprises multiple authentication screens, wherein a difficulty of challenge level is adjusted by at least one of
varying complexity for each screen of a set of one or more authentication screens presented for a corresponding alternative graphic pattern challenge to the login candidate,
varying a number of successive authentication screens presented to the login candidate, or
varying time given to the login candidate to respond to each screen of the set of one or more authentication screens.

13. The user authentication system of claim 1, wherein the login candidate's interaction with the login interface comprises one or more online interactions with a login domain interface.

14. A method of authenticating logins to a system, the method comprising:
collecting a plurality of observable characteristics for a current login attempt by a login candidate, the current login attempt requesting a login for a given user identifier (UID) of a group of UIDs for a login domain, the plurality of observable characteristics including information characterizing
the login candidate's interaction with a login interface to the domain, and at least one additional aspect of the current login attempt;

maintaining, in a login feature data store and for each UID in the group of UIDs, information indicative of collected observable characteristics from one or more past authenticated login attempts;

supplying input to a trained artificial intelligence (AI) risk assessor, the input comprising
the collected plurality of observable characteristics for the current login attempt, and
information maintained in the login feature data store indicative of collected observable characteristics from one or more past authenticated login attempts for the given UID;

by the trained AI risk assessor and based on the supplied input, forming an assessment of risk that the login candidate is unauthentic;

setting, from among a plurality of different challenge levels available for the given UID, a difficulty of challenge level, based at least in part on the assessment of risk formed by the trained AI risk assessor, and for the current login attempt;
interacting with the login candidate to obtain one or more authentication responses for the set difficulty of challenge level to determine whether the login candidate is an authentic user for the given UID; and maintaining, in an authentication data store and for each UID of the group of UIDs, at least one registered authentication item created for that UID from input from a respective authentic user of that UID, wherein the at least one registered authentication item for the given UID comprises a registered graphic pattern; and the plurality of different challenge levels comprise
a first challenge level that directs the login candidate to reproduce, from a set of basic elements, the registered graphic pattern for the given UID, and
a second challenge level that instructs the login candidate to select, from an array of alternative graphic patterns that excludes the registered graphic pattern, a pattern that is within a threshold difference of matching the registered graphic pattern.

15. The method of claim 14, wherein the information characterizing the login candidate's interaction with the device interface comprises input timing and/or movement values collected proximate in time to the current login attempt.

16. The method of claim 14, wherein the at least one additional aspect of the current login attempt comprises at least one of hardware specifics for a computing device associated with the current login attempt, operating system specifics for the computing device, web browser identification, network address information, network communication attributes, or browsing history.

17. The method of claim 14, wherein the information indicative of collected observable characteristics from past successful login attempts comprises information from up to a selected threshold number of past successful login attempts for each of the group of UIDs, the method further comprising, upon successful authentication by the login candidate for the current login attempt, saving information from the collected plurality of observable characteristics to the login feature data store for the given UID.

18. The method of claim 14, further comprising, upon unsuccessful authentication by the login candidate for the current login attempt, saving information from the collected plurality of observable characteristics to the login feature data store for the given UID along with an indication that the saved information corresponds to an invalid login attempt.

* * * * *